United States Patent
Abe et al.

(10) Patent No.: US 9,881,410 B2
(45) Date of Patent: Jan. 30, 2018

(54) MEDICAL DIAGNOSTIC IMAGING APPARATUS, IMAGE PROCESSING APPARATUS, AND IMAGE GENERATING METHOD

(71) Applicant: Toshiba Medical Systems Corporation, Otawara-shi (JP)

(72) Inventors: Yasuhiko Abe, Otawara (JP); Tomoya Okazaki, Kawasaki (JP)

(73) Assignee: Toshiba Medical Systems Corporation, Otawara-shi (JP)

( * ) Notice: Subject to any disclaimer, the term of this patent is extended or adjusted under 35 U.S.C. 154(b) by 6 days.

(21) Appl. No.: 14/934,647

(22) Filed: Nov. 6, 2015

(65) Prior Publication Data

US 2016/0140707 A1  May 19, 2016

(30) Foreign Application Priority Data

Nov. 14, 2014  (JP) .................. 2014-231999

(51) Int. Cl.
*G06K 9/00* (2006.01)
*G06T 15/00* (2011.01)
(Continued)

(52) U.S. Cl.
CPC ............ *G06T 15/00* (2013.01); *G06K 9/3233* (2013.01); *G06T 7/248* (2017.01); *G06T 11/206* (2013.01);
(Continued)

(58) Field of Classification Search
None
See application file for complete search history.

(56) References Cited

U.S. PATENT DOCUMENTS

2004/0087853 A1* 5/2004 Fujisawa ............... A61B 6/032
600/425
2011/0044522 A1* 2/2011 Fancourt ............... G06T 7/2033
382/131
(Continued)

FOREIGN PATENT DOCUMENTS

JP  2016-67559 A  5/2016

OTHER PUBLICATIONS

Tomoyuki Takeguchi, et al., "Practical considerations for a method of rapid cardiac function analysis based on three-dimensional speckle tracking in a three-dimensional diagnostic ultrasound system" Journal of Medical Ultrasonics, vol. 37, Apr. 2010, 9 Pages.

*Primary Examiner* — Shervin Nakhjavan
(74) *Attorney, Agent, or Firm* — Oblon, McClelland, Maier & Neustadt, L.L.P.

(57) ABSTRACT

A medical diagnostic imaging apparatus according to embodiments includes storage circuitry and processing circuitry. The storage circuitry stores therein volume data concerning a three-dimensional region inside an object. The processing circuitry calculates an index value concerning a region of interest in the volume data, and generates a first medical image and a second medical image based on the index value. The respective positions in the first medical image and the second medical image are associated with each other by a certain coordinate conversion. The region of interest is divided into a plurality of first regions by a first boundary position. The second medical image is divided into a plurality of second regions by a second boundary position that is not altered in accordance with the alteration of the first boundary position.

13 Claims, 14 Drawing Sheets

(51) Int. Cl.
*G06K 9/32* (2006.01)
*G06T 11/20* (2006.01)
*G06T 7/246* (2017.01)
*G01S 15/89* (2006.01)
*G01S 7/52* (2006.01)

(52) U.S. Cl.
CPC ....... *G01S 7/52071* (2013.01); *G01S 15/8993* (2013.01); *G06K 2209/05* (2013.01); *G06T 2207/10132* (2013.01); *G06T 2207/30048* (2013.01)

(56) References Cited

U.S. PATENT DOCUMENTS

| | | | |
|---|---|---|---|
| 2011/0190634 A1* | 8/2011 | Kawagishi | A61B 8/14 600/443 |
| 2012/0263368 A1* | 10/2012 | Nakano | A61B 6/032 382/133 |
| 2016/0093044 A1 | 3/2016 | Okazaki et al. | |

* cited by examiner

BEFORE ALTERATION → AFTER ALTERATION

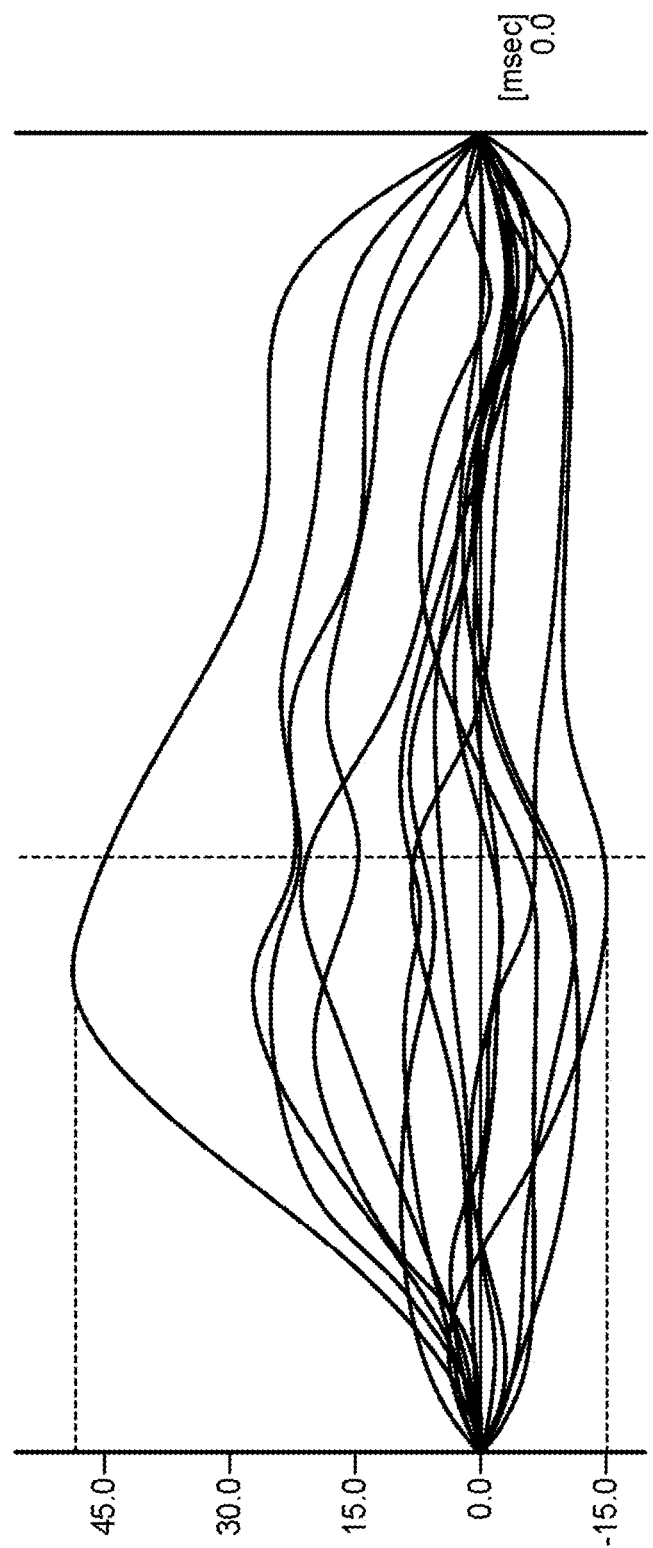

MEDICAL DIAGNOSTIC IMAGING APPARATUS, IMAGE PROCESSING APPARATUS, AND IMAGE GENERATING METHOD

CROSS-REFERENCE TO RELATED APPLICATIONS

This application is based upon and claims the benefit of priority from Japanese Patent Application No. 2014-231999, filed on Nov. 14, 2014, the entire contents of all of which are incorporated herein by reference. The entire contents of the prior Japanese Patent Application No. 2015-178502, filed on Sep. 10, 2015, are also incorporated herein by reference.

FIELD

Embodiments described herein relate generally to a medical diagnostic imaging apparatus, an image processing apparatus, and an image generating method.

BACKGROUND

Conventionally, to evaluate the cardiac function objectively and quantitatively, techniques have been available that obtain a wall motion index regarding, for example, a displacement or a strain of tissue in the heart. For example, an ultrasonic diagnostic apparatus collects three-dimensional ultrasonic image data of the heart in a time series, performs pattern matching of a local region on ultrasonic images, performs tracking of the local region, and thereby estimates the wall motion index of the heart.

As a display form useful in three-dimensionally analyzing a wall motion index of the heart, a polar map display is known. This polar map is a display form in which, for example, the information about a region of interest defined on the surface of a left ventricle is developed and displayed on a two-dimensional plane with a ventricular apex defined as a pole. In an ultrasonic diagnostic apparatus, color-coding of the obtained wall motion index of the heart and mapping thereof on a polar map are performed, for example. In single-photon emission computed tomography (SPECT) apparatuses, the same display form as the foregoing is referred to as a bull's eye display.

BRIEF DESCRIPTION OF THE DRAWINGS

FIG. 9 is a diagram illustrating one example of the processing of the display controller in the first embodiment;

DETAILED DESCRIPTION

A medical diagnostic imaging apparatus according to embodiments includes storage circuitry and processing circuitry. The storage circuitry stores therein volume data concerning a three-dimensional region inside an object. The processing circuitry calculates an index value concerning a region of interest in the volume data, and generates a first medical image and a second medical image based on the index value. Corresponding positions in the first medical image and the second medical image are associated with each other by a certain coordinate conversion. The region of interest is divided into a plurality of first regions by a first boundary position. The second medical image is divided into a plurality of second regions by a second boundary position that is not altered in accordance with the alteration of the first boundary position.

With reference to the accompanying drawings, the following describes a medical diagnostic imaging apparatus, an image processing apparatus, and an image generating method according to embodiments.

In the following description, situations are explained in which the embodiments are applied to an ultrasonic diagnostic apparatus as one example of the medical diagnostic imaging apparatus. The embodiments, however, are not limited to this. For example, the embodiments may be applied to an X-ray diagnostic apparatus, an X-ray computed tomography (CT) apparatus, a magnetic resonance imaging (MRI) apparatus, a single photon emission computed tomography (SPECT) apparatus, a positron emission tomography (PET) apparatus, a SPECT-CT apparatus in which a SPECT apparatus and an X-ray CT apparatus are integrally combined, a PET-CT apparatus in which a PET apparatus and an X-ray CT apparatus are integrally combined, a PET-MRI apparatus in which a PET apparatus and an MRI apparatus are integrally combined, or a group of apparatuses that includes a plurality of the foregoing apparatuses.

First Embodiment

Figure 1:
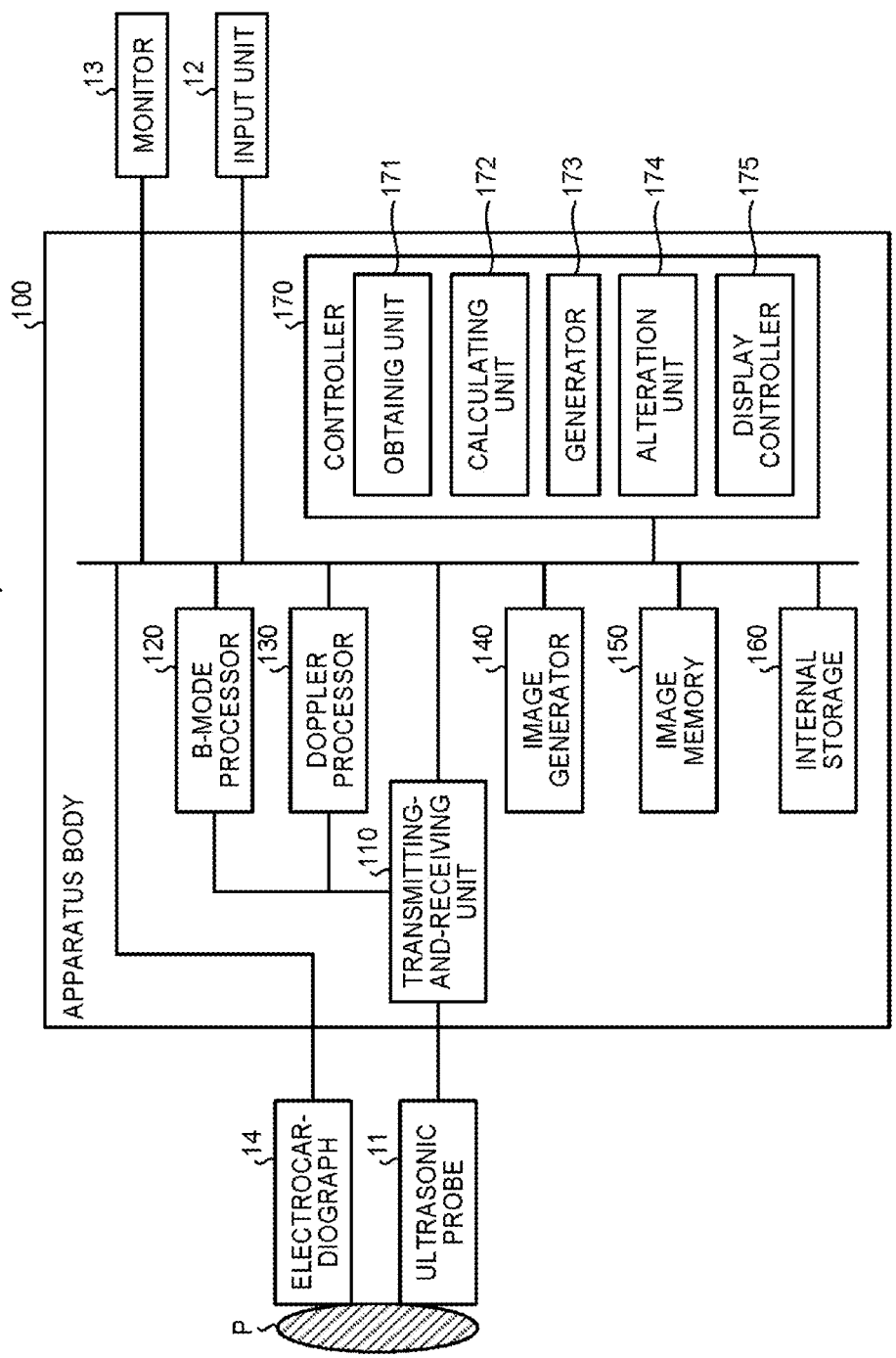
FIG. 1 is a block diagram illustrating an example of the configuration of an ultrasonic diagnostic apparatus according to a first embodiment.

FIG. 1 is a block diagram illustrating an example of the configuration of an ultrasonic diagnostic apparatus according to a first embodiment. As illustrated in FIG. 1, an ultrasonic diagnostic apparatus 1 in the first embodiment includes an ultrasonic probe 11, an input unit 12, a monitor 13, an electrocardiograph 14, and an apparatus body 100.

The ultrasonic probe 11 includes a plurality of piezoelectric transducer elements, and these piezoelectric transducer elements generate ultrasonic waves based on a drive signal supplied from a transmitting-and-receiving unit 110 of the apparatus body 100 which will be described later. The ultrasonic probe 11 receives reflected waves from an object P and converts them into electrical signals. The ultrasonic probe 11 further includes, for example, a matching layer that is provided on the piezoelectric transducer elements, a backing material that prevents ultrasonic waves from propagating toward the rear from the piezoelectric transducer elements. The ultrasonic probe 11 is detachably connected to the apparatus body 100.

When ultrasonic waves are transmitted to the object P from the ultrasonic probe 11, the transmitted ultrasonic waves are successively reflected by a surface where acoustic impedance is discontinuous in the body tissue of the object P, and are received by the piezoelectric transducer elements of the ultrasonic probe 11 as reflected wave signals. The amplitude of the reflected wave signal received is dependent on the difference in acoustic impedance at the discontinuous surface by which the ultrasonic waves are reflected. When the transmitted ultrasonic pulses are reflected by, for example, the surfaces of blood flow or the cardiac wall in motion, the reflected wave signal undergoes frequency deviation that is dependent on the velocity component of a moving body with respect to the transmitting direction of the ultrasonic waves by the Doppler effect.

For example, in the first embodiment, for three-dimensional scanning of the object P, a mechanical 4D probe or a 2D array probe is connected to the apparatus body 100 as the ultrasonic probe 11. The mechanical 4D probe is capable of performing two-dimensional scans by using a plurality of piezoelectric transducer elements arrayed in a single row as in a 1D array probe, and is also capable of performing three-dimensional scans by swinging the piezoelectric transducer elements at a given angle (swing angle). The 2D array probe is capable of performing three-dimensional scans by a plurality of piezoelectric transducer elements disposed in a matrix, and is also capable of performing two-dimensional scans by focusing and transmitting ultrasonic waves.

The input unit 12 includes a mouse, a keyboard, buttons, panel switches, a touch command screen, a foot switch, a trackball, a joystick, and other devices, receives various setting requests from an operator of the ultrasonic diagnostic apparatus 1, and transfers the received various setting requests to the apparatus body 100.

The monitor 13 displays a graphical user interface (GUI) for the operator of the ultrasonic diagnostic apparatus to input various setting requests by using the input unit 12, and displays ultrasonic image data generated in the apparatus body 100 and other data.

The electrocardiograph 14 acquires electrocardiogram (ECG) of the object P as a biosignal of the object P that is ultrasonically scanned. The electrocardiograph 14 transmits the acquired ECG to the apparatus body 100.

The apparatus body 100 is a device that generates ultrasonic image data based on the reflected wave signals received by the ultrasonic probe 11. The apparatus body 100 illustrated in FIG. 1 is a device capable of generating two-dimensional ultrasonic image data based on two-dimensional reflected wave data received by the ultrasonic probe 11. Furthermore, the apparatus body 100 illustrated in FIG. 1 is a device capable of generating three-dimensional ultrasonic image data based on three-dimensional reflected wave data received by the ultrasonic probe 11. The three-dimensional ultrasonic image data is one example of "three-dimensional medical image data" or "volume data."

The apparatus body 100 includes, as illustrated in FIG. 1, the transmitting-and-receiving unit 110, a B-mode processor 120, a Doppler processor 130, an image generator 140, an image memory 150, internal storage 160, and a controller 170.

The transmitting-and-receiving unit 110 includes a pulse generator, a transmission delay unit, a pulser, and other units, and supplies drive signals to the ultrasonic probe 11. The pulse generator repeatedly generates rate pulses to form ultrasonic waves at a given rate frequency. The transmission delay unit assigns, to each of the rate pulses generated by the pulse generator, a delay time that is necessary for each of the piezoelectric transducer elements to focus the ultrasonic waves generated by the ultrasonic probe 11 into a beam shape and to determine the transmission directivity. The pulser applies the drive signals (drive pulses) to the ultrasonic probe 11 at the timing based on the rate pulses. That is, the transmission delay unit varies the delay times assigned to the respective rate pulses, and thereby adjusts, into any desired direction, the transmission direction of the ultrasonic waves transmitted from the plane of the piezoelectric transducer elements.

The transmitting-and-receiving unit 110 has a function capable of instantly changing, for example, transmission frequencies or transmission drive voltages in order to execute a given scan sequence, based on instructions of the controller 170 which will be described later. In particular, changing transmission drive voltages is implemented by an oscillator circuit of a linear amplifier type capable of instantly switching values thereof or by a mechanism that electrically switches a plurality of power supply units.

The transmitting-and-receiving unit 110 further includes a pre-amplifier, an analog-to-digital (A/D) converter, a reception delay unit, an adder, and other units, and performs a variety of processing on the reflected wave signal received by the ultrasonic probe 11 and thereby generates reflected wave data. The pre-amplifier amplifies the reflected wave signal for each channel. The A/D converter performs A/D conversion on the amplified reflected wave signal. The reception delay unit assigns delay times necessary to determine the reception directivity. The adder performs addition processing on the reflected wave signal processed by the reception delay unit and generates the reflected wave data. By the addition processing of the adder, the reflection component of the reflected wave signal from a direction corresponding to the reception directivity is emphasized. By the reception directivity and the transmission directivity, an overall beam of ultrasonic transmission and reception is formed.

When scanning a two-dimensional region of the object P, the transmitting-and-receiving unit 110 causes the ultrasonic probe 11 to transmit an ultrasonic beam in two-dimensional directions. The transmitting-and-receiving unit 110 then generates two-dimensional reflected wave data from reflected wave signals received by the ultrasonic probe 11. When scanning a three-dimensional region of the object P, the transmitting-and-receiving unit 110 causes the ultrasonic probe 11 to transmit an ultrasonic beam in three-dimensional directions. The transmitting-and-receiving unit 110 then generates three-dimensional reflected wave data from reflected wave signals received by the ultrasonic probe 11.

The form of the output signal from the transmitting-and-receiving unit 110 is selectable from various forms such as a case of a signal referred to as a radio frequency (RF) signal in which phase information is included and a case of amplitude information after envelope detection processing.

The B-mode processor 120 receives the reflected wave data from the transmitting-and-receiving unit 110, performs the processing of logarithmic amplification, envelope detection, and other processing, and generates data in which the signal intensity is expressed by the brightness of luminance (B-mode data).

The Doppler processor 130 performs frequency analysis on velocity information from the reflected wave data received from the transmitting-and-receiving unit 110, extracts a blood flow, tissue, or an echo component of a contrast agent by the Doppler effect, and generates data (Doppler data) in which moving body information such as the velocity, the dispersion, and the power has been extracted at multi-points.

The B-mode processor 120 and the Doppler processor 130 in the first embodiment are capable of performing processing on both the two-dimensional reflected wave data and the three-dimensional reflected wave data. That is, the B-mode processor 120 generates two-dimensional B-mode data from the two-dimensional reflected wave data and generates three-dimensional B-mode data from the three-dimensional reflected wave data. The Doppler processor 130 generates two-dimensional Doppler data from the two-dimensional reflected wave data and generates three-dimensional Doppler data from the three-dimensional reflected wave data.

The image generator 140 generates ultrasonic image data from the data generated by the B-mode processor 120 and the Doppler processor 130. That is, the image generator 140 generates two-dimensional B-mode image data that represents the intensity of reflected waves in luminance from the two-dimensional B-mode data generated by the B-mode processor 120. The image generator 140 further generates two-dimensional Doppler image data that represents the moving body information from the two-dimensional Doppler data generated by the Doppler processor 130. The two-dimensional Doppler image data is velocity image data, dispersion image data, power image data, or image data of the combination of the foregoing. The image generator 140 is also capable of generating Doppler waveforms in which the velocity information on blood flow and tissue is plotted in time series from the Doppler data generated by the Doppler processor 130.

The image generator 140, in general, converts (scan-converts) the scanning-line signal sequences of ultrasonic scans into scanning-line signal sequences of a video format typified by television and the like, and generates ultrasonic image data for display. Specifically, the image generator 140 performs coordinate conversion depending on the scanning form of ultrasonic waves by the ultrasonic probe 11 and thereby generates the ultrasonic image data for display. The image generator 140, by using a plurality of image frames after scan conversion, further performs image processing (smoothing processing) to regenerate an image with an average luminance value and image processing (edge enhancement processing) that applies a differential filter within the images, as a variety of image processing other than the scan conversion, for example. The image generator 140 combines character information of various parameters, scales, body marks, and other information with the ultrasonic image data.

That is, the B-mode data and the Doppler data are ultrasonic image data before scan conversion processing, and the data that the image generator 140 generates is the ultrasonic image data for display after scan conversion processing. The B-mode data and the Doppler data are also referred to as raw data.

Furthermore, the image generator 140 performs coordinate conversion on the three-dimensional B-mode data generated by the B-mode processor 120 and thereby generates three-dimensional B-mode image data. The image generator 140 further performs coordinate conversion on the three-dimensional Doppler data generated by the Doppler processor 130 and thereby generates three-dimensional Doppler image data. That is, the image generator 140 makes "three-dimensional B-mode image data and three-dimensional Doppler image data" into "three-dimensional ultrasonic image data (volume data)."

Moreover, the image generator 140 performs rendering processing on volume data to generate a variety of two-dimensional image data to display the volume data on the monitor 13. The rendering processing to be performed by the image generator 140 includes the processing of generating multi-planar reconstruction (MPR) image data from the volume data by performing MPR. Furthermore, the rendering processing to be performed by the image generator 140 includes the processing of performing "curved MPR" on the volume data and the processing of performing "maximum intensity projection" on the volume data. The rendering processing to be performed by the image generator 140 further includes volume rendering (VR) processing and surface rendering (SR) processing.

The image memory 150 is a memory that stores therein the image data for display generated by the image generator 140. The image memory 150 can also store therein the data generated by the B-mode processor 120 and the Doppler processor 130. The B-mode data and the Doppler data stored in the image memory 150 can be called up by the operator after diagnosis, and are made into the ultrasonic image data for display via the image generator 140, for example.

The image generator 140 stores, in the image memory 150, ultrasonic image data and the time of ultrasonic scan performed to generate the ultrasonic image data, in association with the ECG transmitted from the electrocardiograph 14. The controller 170 which will be described later can acquire a cardiac phase at the time of the ultrasonic scan performed to generate the ultrasonic image data by referring to the data stored in the image memory 150.

The internal storage 160 stores therein control programs to perform ultrasonic transmission and reception, image processing, and display processing, and stores a variety of data such as diagnostic information (for example, patient IDs and doctor's findings), diagnosis protocols, and various body marks. The internal storage 160 is used also for the archive of the image data stored in the image memory 150 as necessary. The data stored in the internal storage 160 can be transferred to an external device via an interface not depicted. The external device includes a high-performance work station for image processing, a personal computer (PC) used by a doctor who performs image diagnosis, a storage medium such as a CD and a DVD, and a printer, for example.

The controller 170 controls the overall processing of the ultrasonic diagnostic apparatus. Specifically, based on the various setting requests received from the operator via the input unit 12, and on various control programs and a variety of data read in from the internal storage 160, the controller 170 controls the processing of the transmitting-and-receiving unit 110, the B-mode processor 120, the Doppler processor 130, and the image generator 140. Furthermore, the controller 170 performs control so as to display the ultrasonic image data for display stored in the image memory 150 and the internal storage 160 on the monitor 13.

Furthermore, the controller 170 provides a wall motion index (motion information) of tissue that periodically moves. For example, the controller 170 acquires the ultrasonic image data of the heart stored in the image memory 150, performs wall motion tracking (WMT) of the heart by image processing, and thereby calculates a wall motion index of a myocardium. The controller 170 then stores the generated wall motion index in the image memory 150 or the internal storage 160. The processing of the controller 170 to calculate the wall motion index will be described later.

As a display form useful in three-dimensionally analyzing the wall motion index of the heart, a polar map display is known. This polar map is a display form in which, for example, the information about a region of interest defined on the surface of a left ventricle is developed and displayed on a two-dimensional plane with the ventricular apex thereof defined as a pole. For example, in an ultrasonic diagnostic apparatus, the obtained wall motion index of the heart is color-coded and mapped on a polar map. In the analysis of the left ventricle, for example, a standard segment model defined by the American Society of Echocardiography or the American Heart Association is applied, and a polar map display divided into 16 or 17 local regions (segments) is made.

The above-described standard segment model is division anticipated in standard cases that is based on territories of the coronary artery in the case of the left ventricle, for example. The coronary territories therefore are not always appropriately applicable to all the cases. In other words, in individual cases, alteration of a boundary of the segment model may be necessary. In the analysis of myocardium of the regions other than the left ventricle (left atrium, right ventricle, and right atrium), there are no standard segment models available, and thus alteration of a boundary position is necessary for defining a desired region of interest divided into boundaries. However, there have been cases where, when alteration of a boundary of the segment model in a three-dimensional image is directly reflected in a polar map, the referentiality of the polar map is changed.

Figure 2:
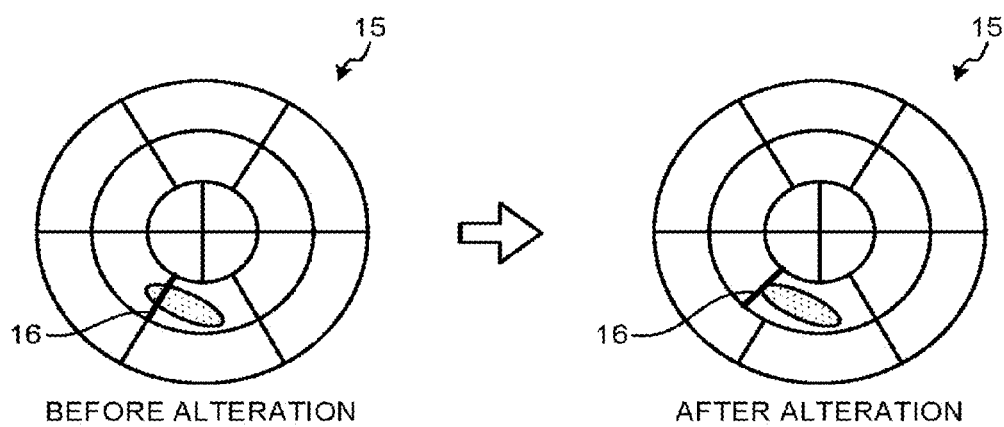
FIG. 2 is a diagram for explaining an inconvenience.

FIG. 2 is a diagram for explaining an inconvenience. On the left in FIG. 2, one example of a polar map 15 before altering a boundary is illustrated, and on the right in FIG. 2, one example of the polar map 15 after altering the boundary is illustrated. As illustrated in FIG. 2, when the position of a boundary line 16 is altered, it results in a form different from the standard segment model before altering the boundary, and as a result of the occurrence of a discontinuity at a portion in which the boundary line 16 connects to other boundary lines, the referentiality of the polar map 15 is changed.

Consequently, the ultrasonic diagnostic apparatus 1 in the first embodiment is provided with the following configuration in order to display an image in which the referentiality regarding regional motions within a region of interest is maintained even when a boundary fractionating the region of interest is altered.

The controller 170 in the first embodiment includes an obtaining unit 171, a calculating unit 172, a generator 173, an alteration unit 174, and a display controller 175.

In the following description, a situation will be explained in which the controller 170 performs the WMT of the heart and calculates the wall motion index of the myocardium. The first embodiment, however, is not limited to this. For example, what the controller 170 can calculate is not limited to the WMT, and further includes the information concerning the volume of myocardium, and the volume inside the cardiac cavities.

The obtaining unit 171 obtains a group of three-dimensional medical image data in which an object of data collection including at least one chamber region out of the left ventricle, the left atrium, the right ventricle, and the right atrium of the heart is collected for at least one cardiac cycle.

For example, with a sector probe, the operator performs three-dimensional scans on a region including the left ventricle of the object P and collects moving image data of three-dimensional ultrasonic image data where myocardium is visualized. This moving image data is a group of ultrasonic image data including the ultrasonic image data collected by the B-mode for each time phase, for example. The "time phase" indicates any one time point (timing) in periodical motion of the heart and is also referred to as a "cardiac phase."

The image generator 140 then generates moving image data of the LV, and stores the generated moving image data in the image memory 150. The operator then defines a section for one heartbeat from an R-wave to a subsequent R-wave in the ECG as the section of processing target, for example. The first embodiment is applicable even when the section used as a processing target is defined as a section for two heartbeats and as a section for three heartbeats.

The obtaining unit 171 then obtains a group of ultrasonic image data from the image memory 150, for example. This group of ultrasonic image data includes three-dimensional ultrasonic image data (volume data) of a plurality of frames included in the section for one heartbeat defined by the operator. In other words, the image memory 150 as storage circuitry stores therein volume data concerning a three-dimensional region inside an object.

In the first embodiment, a situation of obtaining volume data extending over a plurality of time phases has been described to explain an application example to a speckle tracking method, which is a typical approach for WMT. The first embodiment, however, is not limited to this. For example, the obtaining unit 171 may obtain the volume data corresponding to a single time phase. Consequently, the obtaining unit 171 may obtain the volume data of a single time phase corresponding to end-diastole or end-systole, for example.

In the first embodiment, a situation will be explained in which ultrasonic image data that includes the left ventricle is obtained by the obtaining unit 171 and is used in the following processing. The first embodiment, however, is not limited to this. For example, the ultrasonic image data that the obtaining unit 171 obtains may be the data that includes the right ventricle, or may be the data that includes the whole heart or an area other than the heart.

In the first embodiment, a situation will be explained in which three-dimensional ultrasonic image data generated by the transmission and reception of ultrasonic waves is used as the three-dimensional medical image data. The first embodiment, however, is not limited to this. For example, the three-dimensional medical image data may be three-dimensional medical image data generated by a medical diagnostic imaging apparatus different from the ultrasonic diagnostic apparatus such as an X-ray diagnostic apparatus, an X-ray CT apparatus, an MRI apparatus, a SPECT apparatus, a PET apparatus, a SPECT-CT apparatus in which a SPECT apparatus and a CT apparatus are integrally combined, a PET-CT apparatus in which a PET apparatus and a CT apparatus are integrally combined, a PET-MRI apparatus in which a PET apparatus and an MRI apparatus are integrally combined, or a group of apparatuses including a plurality of the foregoing apparatuses.

The calculating unit 172 calculates a wall motion index on a chamber region from the group of three-dimensional medical image data. For example, the calculating unit 172 calculates the wall motion index by the processing including pattern matching between pieces of the three-dimensional medical image data included in the group of three-dimensional medical image data for at least one cardiac cycle obtained by the obtaining unit 171.

First of all, the calculating unit 172 defines identification information for identifying respective positions for a plurality of positions representing the outline of the LV in three-dimensional medical image data. For example, the calculating unit 172 defines a plurality of tracking points, to which the addresses are assigned, at positions corresponding to the contours (surface) of the RV in at least one piece of ultrasonic image data included in a group of ultrasonic image data. The tracking point is a point that is tracked over time to calculate a motion index of a local region, and is a composition point that constitutes the contours of the local region. The address is a number assigned for identifying each of the tracking points, and is defined based on the position of the respective tracking points of, for example, the endocardium. The addresses are not limited to numbers, and only need to be identification information, such as characters or symbols, which allows identification of the positions of the respective tracking points.

While a situation in which, as one example, the following processing is performed on the endocardium of the LV is described here, the first embodiment is not limited to this. For example, the following processing is performed on an area not limited to the endocardium, and may be performed on the epicardium or on an intermediate layer between the endocardium and epicardium. The following processing is performed on a region not limited to the LV, and may be performed on any given region such as a right ventricle, a left cardiac atrium, a right cardiac atrium, or the heart as a whole, for example. In the first embodiment, the calculating unit 172 defines a plurality of composition points constituting the contours at positions corresponding to the initial contours of the heart in accordance with the information manually defined by the operator.

For example, the operator specifies any desired cardiac phase for the group of volume data obtained by the obtaining unit 171. The cardiac phase that is specified here is a certain frame out of the frames included in the section for one heartbeat, and is an end-diastolic phase (the first R-wave phase), for example. When the certain cardiac phase is then specified by the operator, the calculating unit 172 causes the image generator 140 to execute MPR processing on the volume data of the heart in the specified cardiac phase, and to display, on the monitor 13, an MPR cross-section (reference MPR cross-section) serving as a reference in defining the initial contours. While a situation in which the end-diastolic phase is specified as the certain cardiac phase has been exemplified, it is not limited to this and it may be an end-systolic phase, for example.

The operator specifies an apical four-chamber view (A4C) and an apical two-chamber view (A2C) to be displayed as the first reference MPR cross-section (MPR1) and as the second reference MPR cross-section (MPR2), respectively, for example. The operator then inputs respective initial contours on the displayed apical four-chamber view and the apical two-chamber view. On the MPR cross-sections, not only the endocardium and the epicardium of the heart but also the papillary muscle and the tendinous cord are displayed. Thus, while observing the displayed reference MPR cross-sections, the operator specifies the initial contours at the cardiac end-diastolic phase so that the visualized papillary muscle and the tendinous cord may be excluded.

When the initial contours are input on a plurality of reference MPR cross-sections, the calculating unit 172 generates three-dimensional initial contours from the received two-dimensional initial contours by a known method. Specifically, the calculating unit 172 generates three-dimensional initial contours P_endo from the initial contours of the endocardium of the left ventricle specified on the MPR1 and MPR2.

The calculating unit 172 then assigns respective addresses to a plurality of composition points constituting the three-dimensional initial contours of the endocardium. For example, the calculating unit 172 defines the position of each composition point of the endocardium as P_endo(t,h,d). The variable t represents a frame (cardiac phase) that is included in the section for one heartbeat, the variable h represents an address number in a longitudinal direction, and the variable d represents an address number in a circumferential direction. Because the initial cross-section here is defined by using the first R-wave phase, it is t=0.

Figure 3:
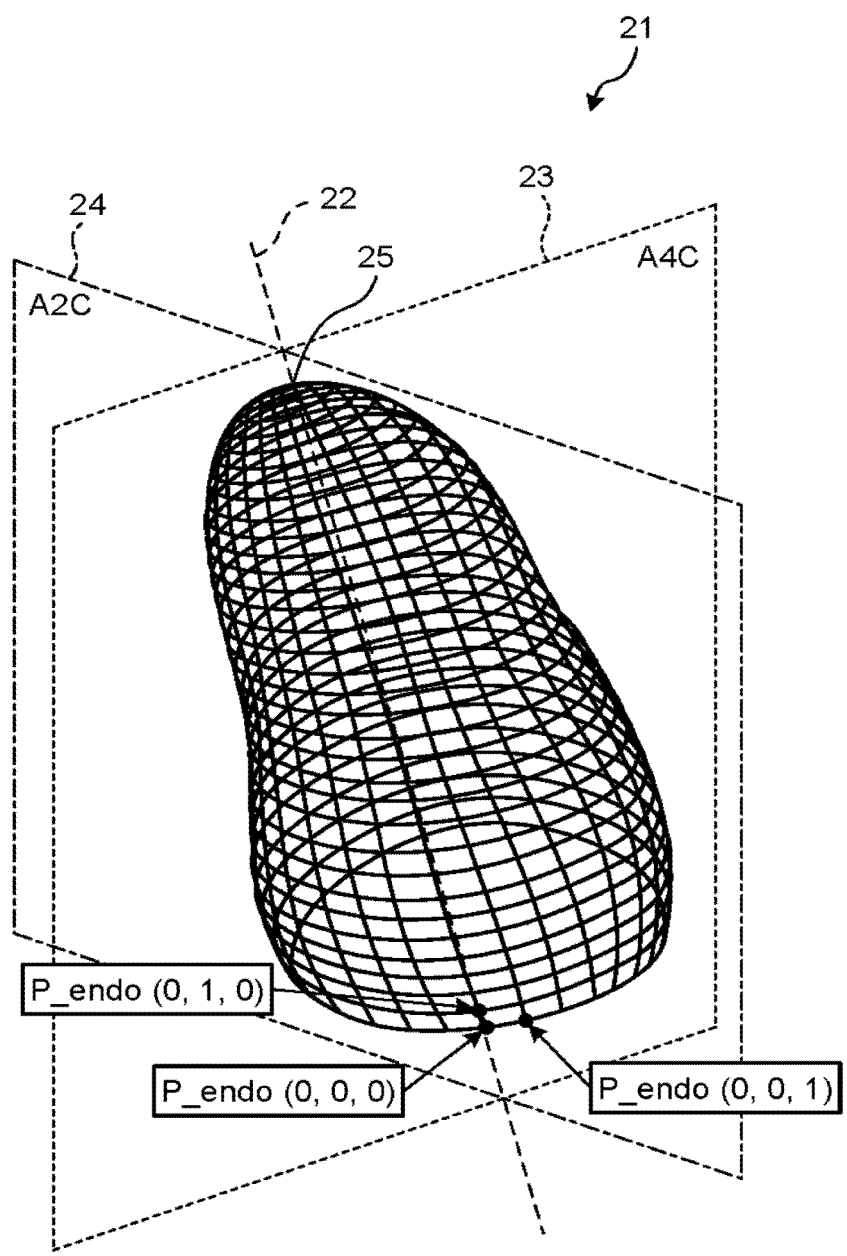
FIG. 3 is a diagram for explaining composition points defined by a calculating module in the first embodiment.

FIG. 3 is a diagram for explaining the composition points defined by the calculating unit 172 in the first embodiment. In the example illustrated in FIG. 2, illustrated is a situation of defining initial contours 21 on the contours of the right ventricular endocardium. Each of the composition points illustrated in FIG. 3 is disposed at an intersection of the contours of the endocardium, a cross-section extending in a longitudinal direction 22, and a cross-section (a short axis cross-section) substantially orthogonal to the longitudinal direction 22. A plane 23 represents the MPR1 (A4C) and a plane 24 represents the MPR2 (A2C).

As illustrated in FIG. 3, the calculating unit 172 defines one side of the positions, at which the initial contours and the MPR1 intersect with each other, as a reference position in the circumferential direction and defines the variable d of the composition point at that position as zero. That is, the position of the composition point located at this reference position is expressed as P_endo(0,h,0). The calculating unit 172 then sets the address numbers of the composition points in sequence in the circumferential direction from the composition point at the reference position as d=1, 2, 3, and so on. The calculating unit 172 further defines the position of the annular contours farthest from a ventricular apex 25 out of the initial contours 21 in three-dimension as the reference position in the longitudinal direction 22, and defines the h of the composition point at that position as zero. That is, the position of the composition point located at this reference position is expressed as P_endo(0,0,d). The calculating unit 172 then sets the address numbers for the composition points in sequence in the apical direction from the composition point at the reference position as h=1, 2, 3, and so on.

While a situation in which the initial contours are specified by using two reference MPR cross-sections has been exemplified in FIG. 3, the embodiment is not limited to this. For example, the initial contours may be specified by using two or more reference cross-sections to the calculating unit 172. While a situation in which the apical four-chamber view and the apical two-chamber view are used as the reference MPR cross-sections has been exemplified, it is not limited to this. For example, as another longitudinal cross-section that runs through the central axis of the left ventricle, an apical long-axis view (A3C) may be used. Alternatively, a short axis view (such as SAX-A (an apical portion level), SAX-M (a middle portion level), or SAX-B (a basal portion level)) that is orthogonal to the longitudinal view, or a cross-sectional view that is defined by a certain positional relation with these cross-sectional views may be used. The processing of displaying a plurality of reference MPR cross-sections is not limited to the above-described manual operation. For example, the reference MPR cross-sections may be displayed automatically by an automatic cross-section detection unit that automatically detects and displays the above-described cross-sectional view from volume data. The specifying of initial contours is not limited to the above-described manual operation. The calculating unit 172 may be configured to specify the initial contours automatically or semi-automatically by using dictionary data of the endocardium contour shape (for example, statistical data of contours defined in the past). Furthermore, the specifying of initial contours may be performed automatically or semi-automatically by using, for example, a boundary detection method that detects boundaries in an image.

The calculating unit 172 then tracks the positions of a plurality of composition points in a plurality of pieces of ultrasonic image data included in the group of ultrasonic image data by performing processing that includes pattern matching by using the ultrasonic image data on which the composition points have been defined and the other ultrasonic image data.

For example, when a plurality of composition points are defined at positions corresponding to the initial contours in the volume data at the frame t=0 included in a group of volume data, the calculating unit 172 performs tracking of the positions of the respective composition points at other frames t by the processing including pattern matching. Specifically, the calculating unit 172 repeatedly performs the pattern matching between the volume data at the frame in which a plurality of composition points have already been defined and the volume data at the frame adjacent to that frame. That is, with the respective composition points P_endo(0,h,d) of the endocardium in the volume data at t=0 as the point of origin, the calculating unit 172 performs the tracking of the positions of the respective composition points P_endo(t,h,d) in the volume data of the respective frames at t=1, 2, 3, and so on. As a result, the calculating unit 172 obtains coordinate information on the respective composition points constituting the endocardium at the respective frames included in the section for one heartbeat.

Using the positions of a plurality of composition points in a plurality of pieces of ultrasonic image data included in each group of ultrasonic image data, the calculating unit 172 then calculates the wall motion index representing the motions of tissue for the respective pieces of ultrasonic image data.

The representative examples of a wall motion index that is calculated by the calculating unit 172 include: the regional myocardial displacement (mm) of the respective composition points for each frame; the regional myocardial strain (%) that is a change rate of a distance between two points are included; and the regional myocardial velocity (cm/s) and the regional myocardial strain rate (1/s) that are the respective time variations of the foregoing. Furthermore, information referred to as dyssynchrony imaging (DI), which assumes these wall motion indices as the input and assumes the peak timing (time) of the index values as the output, is also calculable. The component separation may be performed on each of these pieces of regional wall motion information. In the case of a left ventricle, for example, the analyses are frequently made of components in the longitudinal direction, the circumferential direction, and a wall-thickness (radial) direction. The results of the foregoing analyses are obtained as a longitudinal strain (LS), a circumferential strain (CS), and a radial strain (RS), respectively, and are used for the analysis and diagnosis of the left ventricular function. In a three-dimensional speckle tracking method, a local area change ratio (AC) that has information on each of the LS and the CS is also calculable.

Values of the wall motion index calculated by the calculating unit 172 are assigned to the respective composition points (tracking points) used for the calculation. Specifically, values of the wall motion index calculated from the respective composition points of the endocardium are defined as V_endo(t,h,d). The calculating unit 172 then stores the calculated values of the wall motion index in the image memory 150 for each group of volume data.

As described so far, the calculating unit 172 calculates the wall motion index on a chamber region from the group of three-dimensional medical image data.

In the first embodiment, a situation will be described in which the information on a wall motion index is mapped on a rendering image and a polar map. The embodiment, however, is not limited to this. For example, when values of various indices corresponding to the respective positions of the heart are calculable, those index values may be mapped on the rendering image and the polar map. For example, when the information (for example, a luminance value of each pixel) about a blood flow flowing through the coronary arteries of the heart is obtainable by using a contrast agent and functional MRI (fMRI), the information on the blood flow may be mapped. For example, when index values concerning various metabolic functions (for example, consumption of oxygen) are obtainable by radioisotopes, those index values may be mapped. In this case, the calculating unit 172 as processing circuitry calculates an index value concerning a region of interest in volume data, for example. The rendering image is one example of a first medical image and the polar map is one example of a second medical image.

The generator 173 generates, based on a projection method concerning a chamber region, a map in which respective pieces of the information on the wall motion index of a plurality of regions into which the chamber region has been divided are disposed on a plurality of sections corresponding to the regions, and outputs the map to a display unit.

The generator 173 first defines a region of interest on the group of three-dimensional medical image data. For example, the generator 173 defines a myocardial region concerning at least one chamber of the left ventricle, the left atrium, the right ventricle, and the right atrium of the object as a region of interest. Specifically, it is desirable that the generator 173 define a boundary surface concerning an endocardium surface or a mid-wall surface when defining the region of interest in the myocardial region. When defining the region of interest in a region other than the right ventricle, it is preferable that the generator 173 perform approximation by a spheroidal shape and define the region of interest on the boundary surface.

The generator 173 defines the region of interest the boundary of which passes any of a plurality of positions (composition points). For example, the generator 173 defines, as the region of interest, a group of regions including a plurality of regions adjacent to one another. The group of regions here means, in the case of a left ventricle, a 16-segment model defined by the American Society of Echocardiography and a 17-segment model defined by the American Heart Association, for example.

Figure 4:
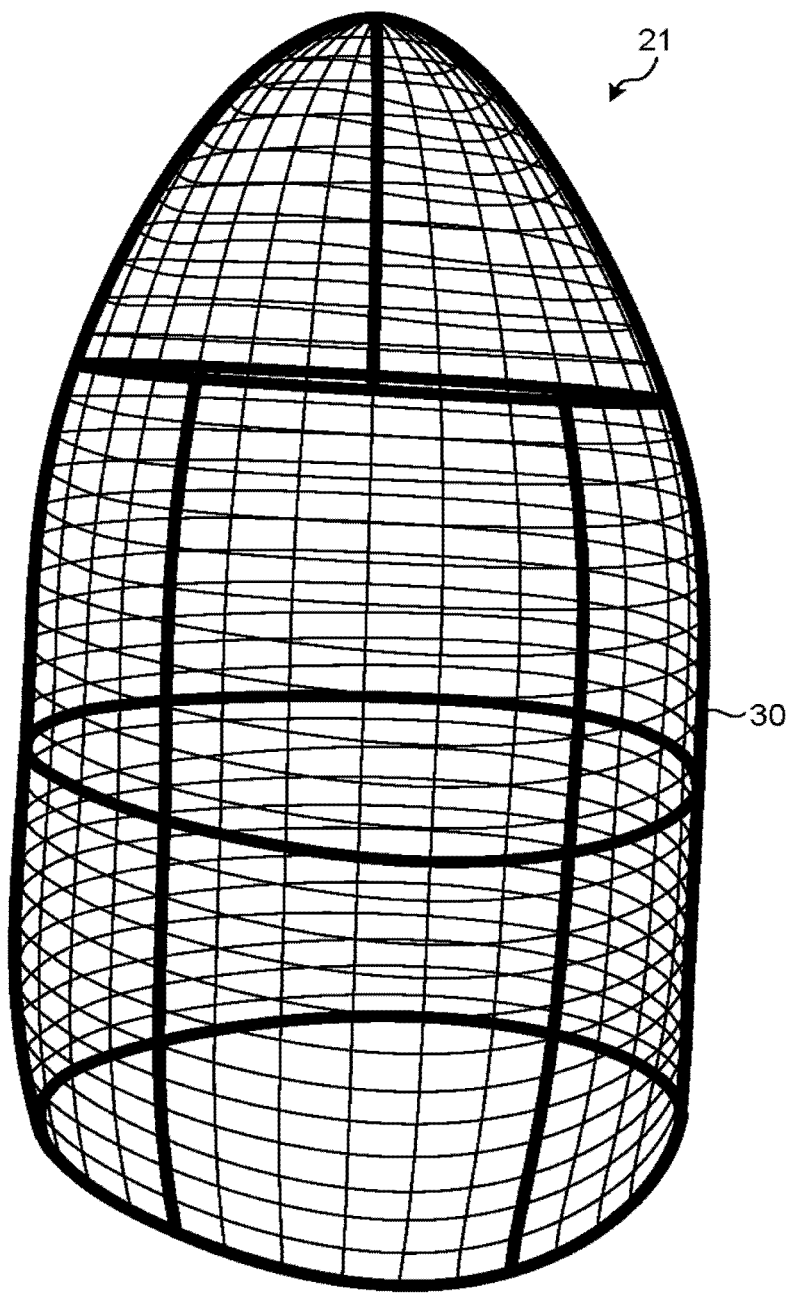
FIG. 4 is a diagram for explaining defining of a region of interest in the first embodiment.

FIG. 4 is a diagram for explaining the defining of a region of interest in the first embodiment. In FIG. 4, illustrated is one example in which a region group 30 of a 16-segment model is defined on the initial contours 21. The region group 30 is indicated by bold lines in FIG. 4.

As illustrated in FIG. 4, the generator 173 defines the region group 30 of the 16-segment model on the initial contours 21 of the three-dimensional medical image data on which a plurality of composition points have been defined by the calculating unit 172. Specifically, the generator 173 divides the initial contours 21 into four in the longitudinal direction at certain address positions. The generator 173 then divides the three-divided initial contours 21 in the circumferential direction at certain address positions, and thereby defines the region group 30 that is composed of a total of 16 regions (segments). The respective regions (segments) included in this 16-segment model are adjacent to one another. In other words, each region and another region adjacent thereto have a common boundary line. That is, the region of interest is divided by the boundary lines into a plurality of regions. The boundary line is one example of a first boundary position and the region is one example of a first region.

As in the foregoing, the generator 173 divides the initial contours 21 at the certain address positions in the longitudinal direction and the circumferential direction, and thereby defines the vertices of the respective regions in the region group 30 at any of the composition points. The certain address positions along which the generator 173 makes divisions are predefined for each segment model (region group) and are stored in a certain storage area of the apparatus body 100.

The generator 173 then displays the three-dimensional medical image data, to which the 16-segment model has been applied, on a polar map having the left ventricular apex as a pole. This polar map includes 16 sections corresponding to the 16 regions included in the 16-segment model. For example, the generator 173 generates a polar map corresponding to an image obtained by SR processing generated by the image generator 140 (hereinafter referred to as SR image) and outputs the polar map to the monitor 13. That is, the image generator 140 as processing circuitry generates a rendering image based on calculated index values.

Figure 5A:
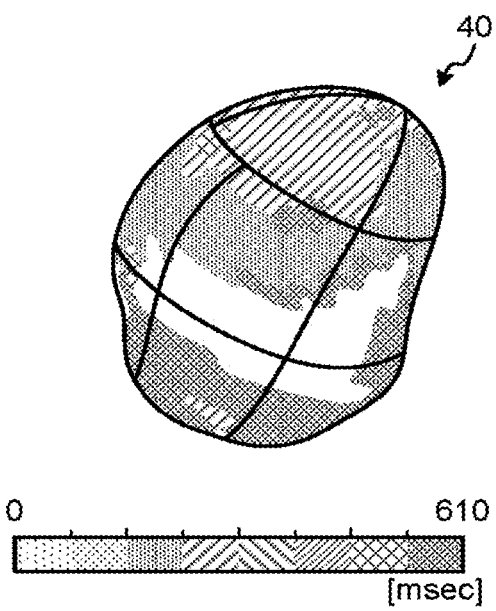
FIGS. 5A to 5D are diagrams for explaining the processing of a generator in the first embodiment.
Figure 5B:
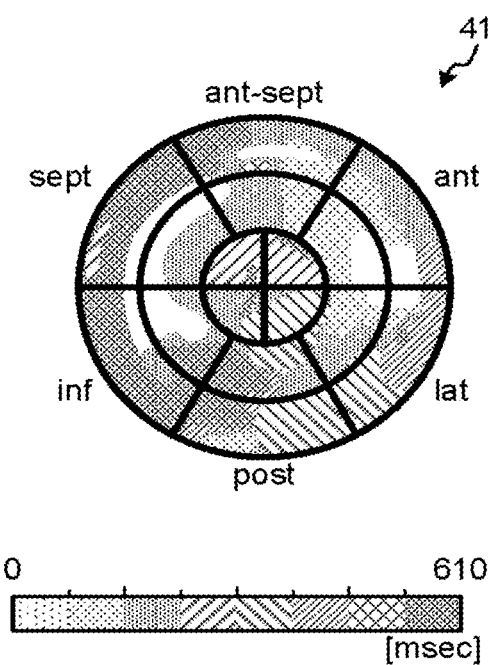
Figure 5C:
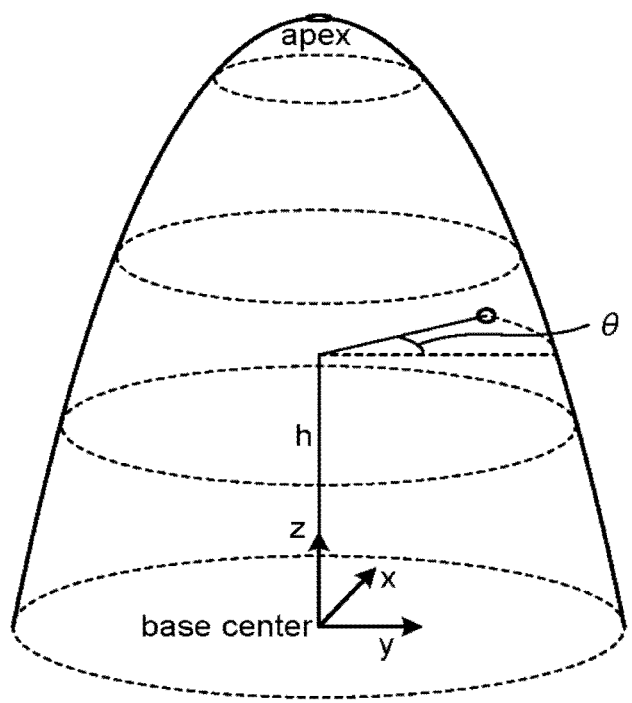
Figure 5D:
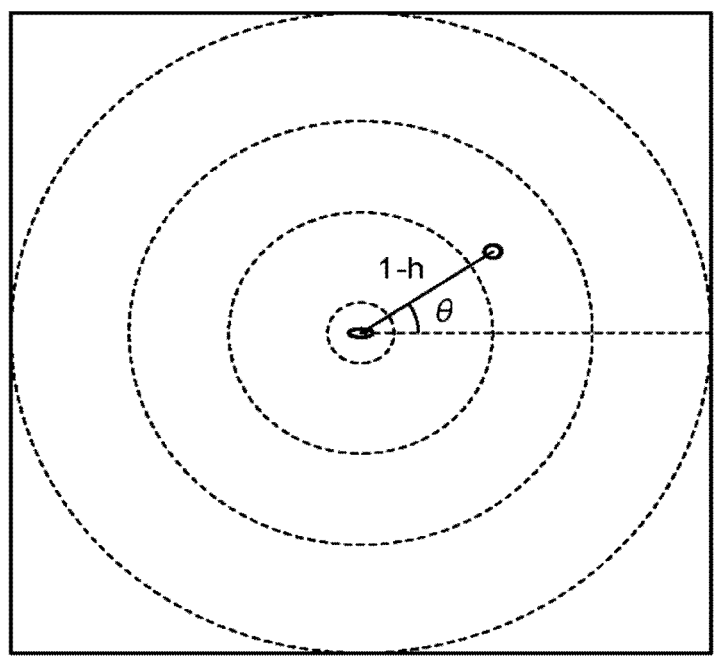

FIGS. 5A to 5D are diagrams for explaining the processing of the generator 173 in the first embodiment. FIG. 5A illustrates one example of an SR image of the left ventricle. FIG. 5B illustrates one example of a polar map corresponding to the SR image in FIG. 5A. FIG. 5C illustrates a position definition of a composition point on a boundary surface. FIG. 5D illustrates a position definition of a composition point on the polar map.

As illustrated in FIG. 5A, the image generator 140 generates an SR image 40 by using volume data of the left ventricle, for example. This SR image 40 is an example in which DI by a regional strain (RS) for which the endocardium surface of myocardium is defined as the region of interest is color-coded by using a certain color map and is displayed on the monitor 13 as a distribution moving image. That is, the SR image 40 is an image in which at least one of the hue, saturation, and lightness determined based on the index values in each of a plurality of regions of the region of interest is assigned to each of a plurality of regions of the SR image 40.

The generator 173 obtains the DI in the volume data depicted in FIG. 5A and maps the color codes corresponding to the DI on a polar map, and thereby generates a polar map 41 depicted in FIG. 5B. Specifically, as illustrated in FIG. 5C, on a surface obtained by approximation using a spheroidal shape, the position of a composition point on the left ventricular surface is defined as (h,θ) by use of two variables denoting a height "h" from an annulus area and an angle "θ" from a reference cross-section in the circumferential direction. Consequently, as illustrated in FIG. 5D, the generator 173 maps the DI of each of the composition points by using a mapping that sets the radius thereof to 1-h and the angle thereof from the reference cross-section to θ with the ventricular apex set at the center. Thus, the generator 173 generates the polar map 41 depicted in FIG. 5B. That is, the respective positions in the SR image 40 and those in the polar map 41 are associated with each other by a certain coordinate conversion. This association is stored in advance in the internal storage 160, for example. The SR image 40 is one example of the first medical image and the polar map 41 is one example of the second medical image.

As described so far, the generator 173 maps the wall motion index included in each of a plurality of regions divided by the 16-segment model to the respective sections of the polar map. That is, the generator 173 as processing circuitry generates a polar map based on calculated index values. The polar map 41 is an image in which at least one of the hue, saturation, and lightness determined based on the index value in each of a plurality of calculation points of the region of interest is assigned to each of a plurality of display points of the polar map 41. Boundaries of a plurality of sections of the polar map 41 previously provide individual regions of interest in a distinguishable manner so that the individual regions can be labeled by at least one of the hue, saturation, and lightness assigned to the respective sections. Furthermore, output values corresponding to the respective sections of the polar map 41 are determined based on statistical values using index values for the calculation points included in the respective regions of interest.

The statistical value here is a representative value for each region calculated as an output for each of a plurality of regions in the region of interest, for example. The representative value for each region may be the average of index values, or may be the median or the mode thereof. Furthermore, the statistical value is not limited to this. Any value calculated from a plurality of index values by a certain calculation method in order to compare the index values included in the region may be applied as a statistical value. It is preferable that such representative values be output by being displayed as a graph of a time-changing curve regarding the index values in each of the regions of interest.

The alteration unit 174 receives an instruction from the operator and alters a boundary position. For example, the alteration unit 174 alters the boundary position so that the boundary position may pass any of a plurality of positions of the composition points.

Figure 6A:
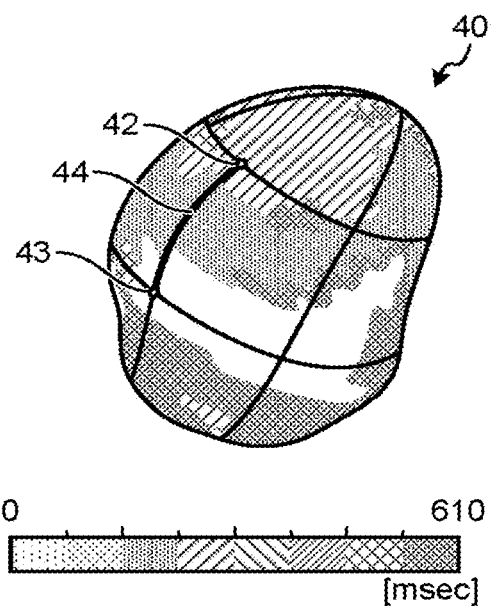
FIGS. 6A and 6B are diagrams for explaining the processing of an alteration module in the first embodiment.
Figure 6B:
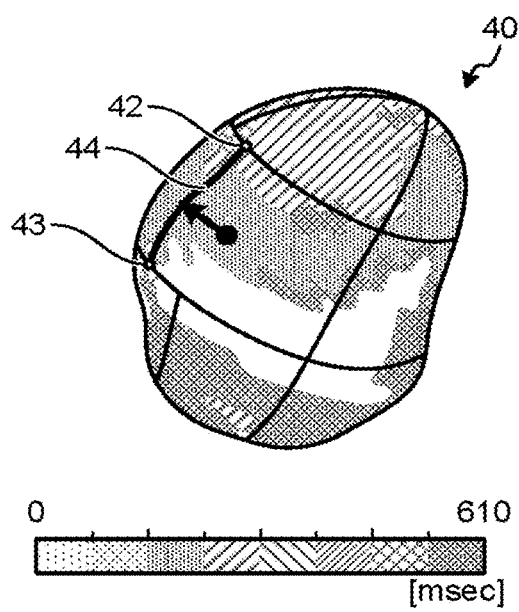

FIGS. 6A and 6B are diagrams for explaining the processing of the alteration unit 174 in the first embodiment. FIG. 6A illustrates one example of an SR image of the left ventricle before alteration of a boundary position and FIG. 6B illustrates one example of the SR image of the left ventricle after alteration of the boundary position. In FIGS. 6A and 6B, a situation is described in which the position of a boundary line 44 connecting a vertex 42 and a vertex 43 of a segment is altered (moved) leftward in these drawings.

The alteration unit 174 first receives input that specifies a boundary position to be an object of alteration. For example, in the example in FIG. 6A, the boundary line 44 is displayed in a manner that enables it to be specified as an object of alteration. When the boundary line 44 is specified by, for example, a mouse cursor, the alteration unit 174 interprets it as indicating that the boundary line 44 has been specified as an object of alteration. The alteration unit 174 may adjust the size, shape, color, and other attributes of the specified boundary line 44 to highlight contents of the display. Specifying an object of alteration is not limited to this, and may be performed by the operation with a keyboard.

The alteration unit 174 then receives specification of the direction of move and the amount of move. The moving direction and the amount of move are associated with the direction of rotation of a mouse wheel and the amount of rotation thereof, respectively, for example. In this case, when the operator rotates the mouse wheel by a certain amount in the upper direction, the alteration unit 174 interprets it as indicating that it has been specified to move the boundary line 44 by a given distance in the left direction.

The direction of move and the amount of move are not limited to the foregoing, and may be assigned to the directions of the arrow keys on a keyboard and to the number of key presses thereof, respectively.

Then, as illustrated in FIG. 6B, the alteration unit 174 alters, in response to the instruction of alteration, the position of the boundary line 44. At this time, the alteration unit 174 alters the boundary line 44 from and to positions at which the addresses have been defined (composition points). The following describes a situation in which: the position of the vertex 42 is at (h,d1); the position of the vertex 43 is at (h2,d2); the direction of move is the left direction; and the amount of move is "a." In this case, the alteration unit 174 moves the vertex 42 and the vertex 43 for "a" addresses in the left direction, for example. That is, the alteration unit 174 adds "a" to the position of the vertex 42 in the circumferential direction, so that it becomes (h1,d1+a). In the same manner, the alteration unit 174 adds "a" to the position of the vertex 43 in the circumferential direction, so that it becomes (h2,d2+a). Furthermore, the alteration unit 174 draws the boundary line 44 that connects the vertex 42 and the vertex 43 after the alteration. For example, the alteration unit 174 obtains a path that is a shortest path between the vertex 42 and the vertex 43 and that passes along the initial contours 21. The alteration unit 174 then draws the boundary line 44 after the alteration so that the boundary line may pass the obtained shortest path. As a result, the boundary line 44 moves leftward as illustrated in FIG. 6B.

As in the foregoing, the alteration unit 174 receives an instruction from the operator and alters a boundary position. While a situation of altering the position of a boundary line has been described herein, applicable situations are not limited to this, and the position of a vertex of a boundary line may be altered. When a vertex is altered, the alteration unit 174 also alters the vertex from and to composition points. After the alteration, the alteration unit 174 obtains the shortest path between the vertex that has been altered and a vertex to be connected thereto, and draws a boundary line.

The display controller 175, when the boundary line of a region corresponding to at least one section of a plurality of sections is altered by an instruction received from the operator, changes a distribution display of a wall motion index with the layout positions of the sections in the map being maintained. Specifically, the display controller 175 displays the boundary lines of a plurality of sections in the map as fixed boundary lines independent of alterations of boundary positions. The display controller 175 then displays, on the monitor 13, a superimposed image in which the information on the wall motion index and the boundary positions of a plurality of regions are superimposed on an image generated from a group of three-dimensional medical image data by three-dimensional SR processing or cross-section reconstruction processing.

Figure 7A:
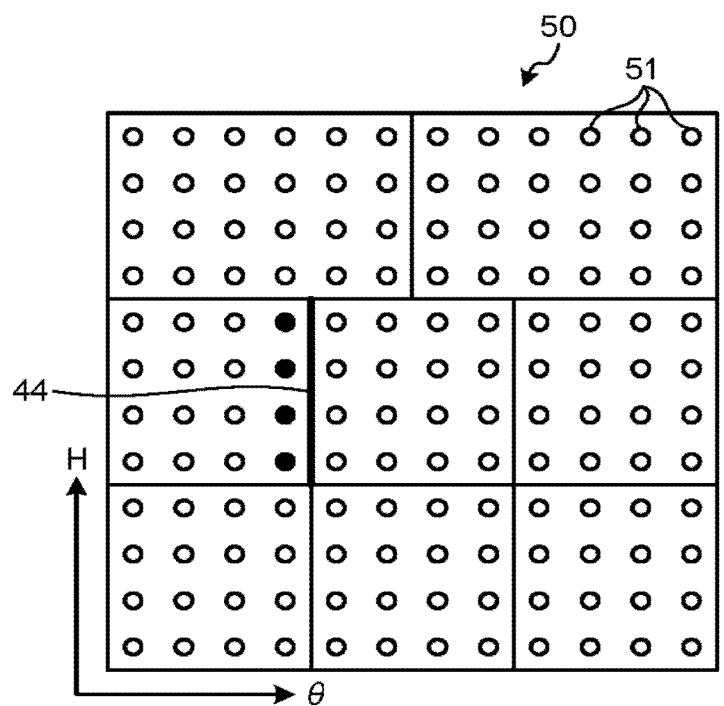
FIGS. 7A and 7B are diagrams for explaining the processing of a display controller in the first embodiment.
Figure 7B:
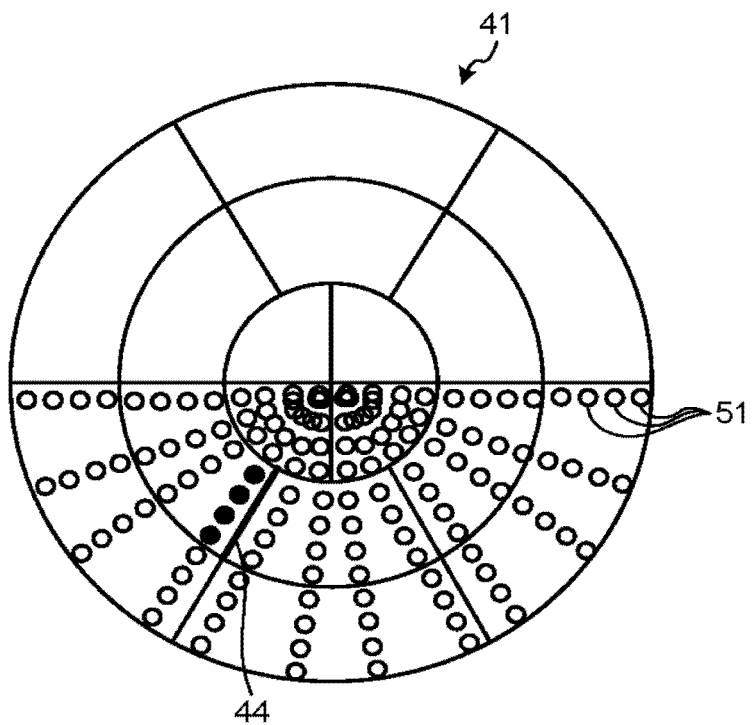
Figure 8A:
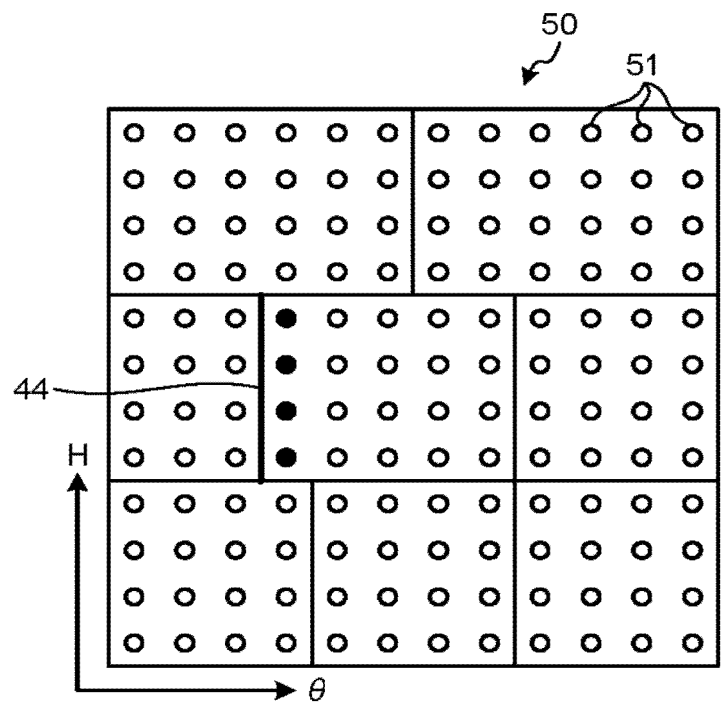
FIGS. 8A and 8B are diagrams for explaining the processing of the display controller in the first embodiment.
Figure 8B:
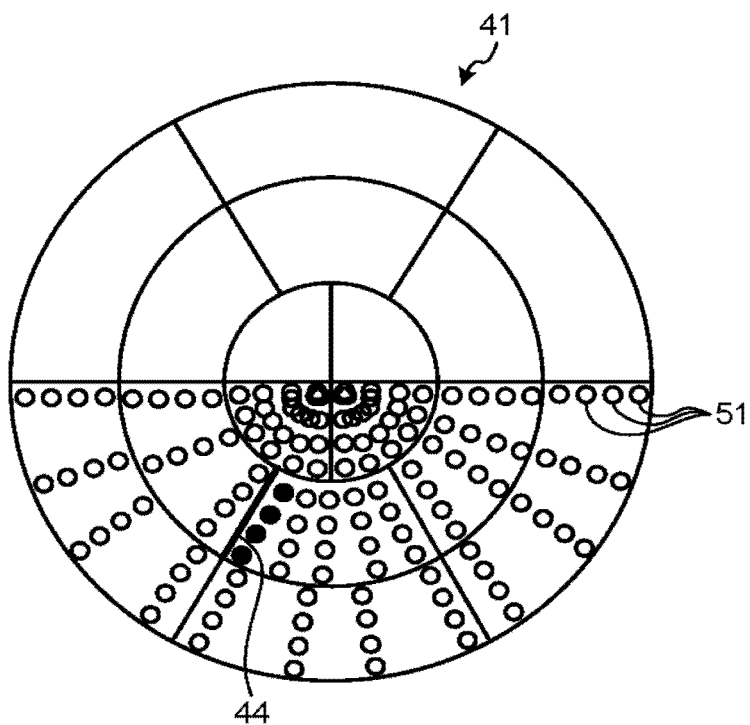

FIGS. 7A to 8B are diagrams for explaining the processing of the display controller 175 in the first embodiment. FIGS. 7A and 8A are schematic diagrams 50 schematically illustrating the relation between tracking points included in the region of interest of the myocardium and segments. FIGS. 7B and 8B are diagrams illustrating the relation between the polar map 41 corresponding to the region of interest of the myocardium and the tracking points. FIGS. 7A and 7B illustrate a state of the boundary line 44 before alteration (see FIG. 6A), and FIGS. 8A and 8B illustrate a state of the boundary line 44 after alteration (see FIG. 6B). For the convenience of explanation, the schematic diagram 50 illustrates 8 segments, out of 16 segments in the region of interest of the myocardium, that correspond to a half of the surface thereof on the near side.

In the schematic diagram 50 in FIG. 7A, the vertical direction corresponds to the address H in the longitudinal direction, and the horizontal direction corresponds to the address θ in the circumferential direction. In FIG. 7A, each of 6 segments positioned in the middle stage and the lower stage equally includes 16 points of the tracking points 51 for 4 addresses in the longitudinal direction and for 4 addresses in the circumferential direction.

The tracking points 51 illustrated in the polar map 41 in FIG. 7B correspond to the tracking points 51 in FIG. 7A. Specifically, the pixel value assigned to each pixel in the polar map is determined by interpolation processing using the wall motion information on a plurality of tracking points 51 near that pixel. That is, the display controller 175 determines the pixel value disposed in a section near the altered boundary position by the interpolation processing using the pixel values based on the wall motion index disposed around the foregoing pixel value. For example, the display controller 175 determines, for a certain pixel, the pixel value of the pixel by performing bi-linear interpolation processing using the wall motion information on the tracking points 51 at the four nearest points thereto.

When the boundary line 44 in FIG. 7A is altered to the position of the boundary line 44 in FIG. 8A, the numbers of the tracking points 51 included in the segments on both sides of the boundary line 44 change. That is, in the segment on the left side of the boundary line 44, the number of the tracking points 51 is reduced by 4 and becomes 12, and in the segment on the right side of the boundary line 44, the number of the tracking points 51 is increased by 4 and becomes 20 (see FIG. 8A).

The display controller 175, however, displays the boundary lines of the polar map as fixed boundary lines independent of alterations of boundary positions. Consequently, the display controller 175 alters, without altering the position of the boundary line 44 in the polar map 41, the number (density) of the tracking points 51 included in the sections on both sides of the boundary line 44. In other words, the polar map is divided into a plurality of sections by the boundary lines that are not altered in accordance with the alterations of the boundary lines on the SR image 40. That is, the display controller 175 has 12 as the number of the tracking points 51 in the segment on the left side of the boundary line 44 of the polar map 41, and has 20 as the number of the tracking points 51 in the segment on the right side of the boundary line 44 (see FIG. 8B). That is, while the density of the tracking points 51 is decreased in the segment on the left side of the boundary line 44, the density of the tracking points 51 is increased in the segment on the right side.

Hence, the display controller 175 disposes the tracking points 51 included in each segment in an equiangular manner, for example. That is, because the width of each segment is 60 degrees, the display controller 175 defines the interval dθ of the respective tracking points as dθ=60 degrees/3 points=20 degrees in the segment on the left side of the boundary line 44, and defines the interval dθ of the respective tracking points as dθ=60 degrees/5 points=12 degrees in the segment on the right side of the boundary line 44. The display controller 175 then determines the pixel values of the respective pixels included in the polar map by performing the foregoing interpolation processing.

As described so far, the display controller 175 alters the mapping of the wall motion information without altering the boundary lines of the sections in the polar map.

Furthermore, the display controller 175 may, as other display of the wall motion information on the left ventricle, generate and display time-variation curves based on the representative values of the wall motion information in the respective local regions. For example, as illustrated in FIG. 9, the display controller 175 displays the time-variation curves of averages obtained by averaging the value of the wall motion information in the respective local regions. When the boundary position of a segment is altered, the wall motion information included in the segment changes, and thus the time-variation curves in all affected segments are also updated. In contrast, in the color-coded mapping of a wall motion index on an SR display or an MPR display, there are no changes even when the boundary position of a segment is altered. FIG. 9 is a diagram illustrating one example of the processing of the display controller 175 in the first embodiment.

Figure 10:
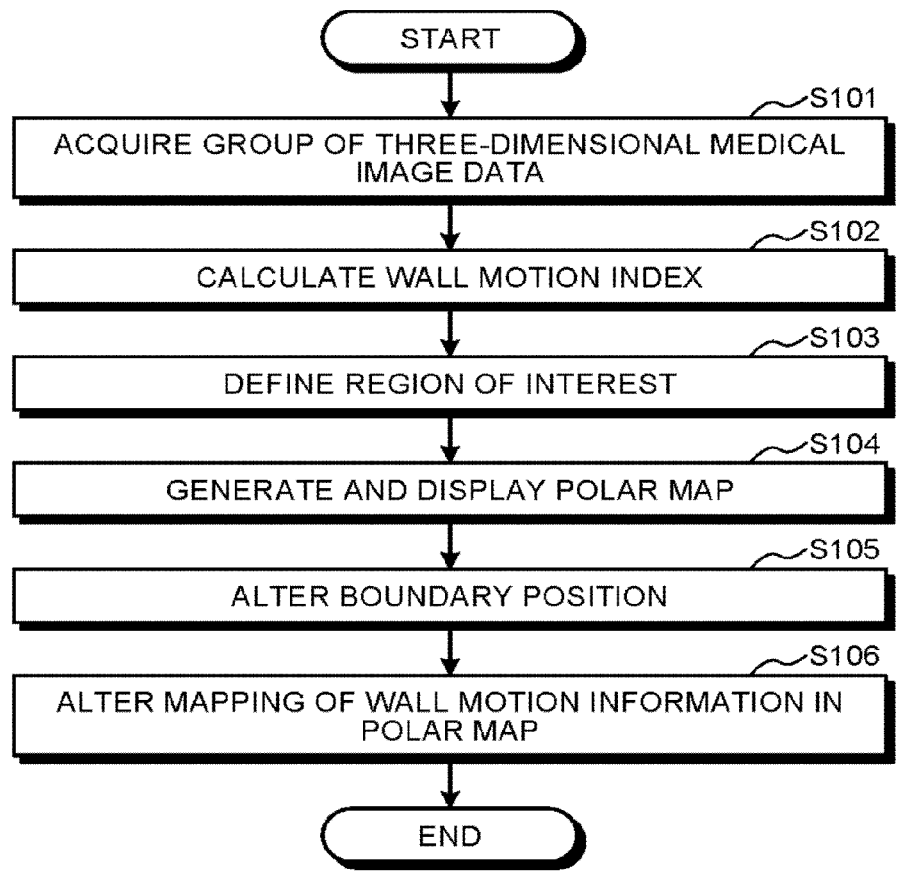
FIG. 10 is a flowchart for explaining processing of the ultrasonic diagnostic apparatus in the first embodiment.

FIG. 10 is a flowchart for explaining the processing of the ultrasonic diagnostic apparatus in the first embodiment.

As illustrated in FIG. 10, in the ultrasonic diagnostic apparatus 1, the obtaining unit 171 obtains a group of three-dimensional medical image data in which an object of data collection including at least one chamber region out of the left ventricle, the left atrium, the right ventricle, and the right atrium of the heart is collected for at least one cardiac cycle (Step S101).

Then, the calculating unit 172 calculates a wall motion index on the chamber region from the group of three-dimensional medical image data (Step S102). For example, the calculating unit 172 calculates the wall motion index by the processing including pattern matching between pieces of the three-dimensional medical image data included in the group of three-dimensional medical image data for at least one cardiac cycle obtained by the obtaining unit 171.

The generator 173 defines a region of interest on the group of three-dimensional medical image data (Step S103). For example, the generator 173 defines the region of myocardium concerning at least one chamber of the left ventricle, the left atrium, the right ventricle, and the right atrium of the object as the region of interest.

The generator 173 then displays the three-dimensional medical image data, to which a 16-segment model has been applied, in the form of a polar map having the left ventricular apex as a pole (Step S104). For example, the generator 173 generates a polar map corresponding to the region of interest of the myocardium generated by the image generator 140 and outputs the polar map to the monitor 13.

The alteration unit 174 receives an instruction from the operator and alters a boundary position (Step S105). For example, the alteration unit 174 alters the boundary position so that the boundary position may pass any of a plurality of positions.

The display controller 175 alters the mapping of the wall motion information without altering the boundary lines of the sections in the polar map (Step S106).

As described above, in the ultrasonic diagnostic apparatus 1, the obtaining unit 171 obtains a group of three-dimensional medical image data in which an object of data collection including at least one chamber region out of the left ventricle, the left atrium, the right ventricle, and the right atrium of the heart is collected for at least one cardiac cycle. The calculating unit 172 calculates a wall motion index on the chamber region from the group of three-dimensional medical image data. The generator 173 generates, based on a certain projection method (a polar map as one example) concerning a chamber region, a map in which respective pieces of the information on the wall motion index of a plurality of regions into which the chamber region has been divided are disposed on a plurality of sections corresponding to the regions, and outputs the map to the monitor 13. The display controller 175, when the boundary line of a region corresponding to at least one section of a plurality of sections is altered by an instruction received from the operator, changes the display of the wall motion index with the layout positions of the sections in the map being maintained. Consequently, the ultrasonic diagnostic apparatus 1 can display an image in which the referentiality of a local motion within a region of interest is maintained even when a boundary fractionating the region of interest is altered.

Figure 11:
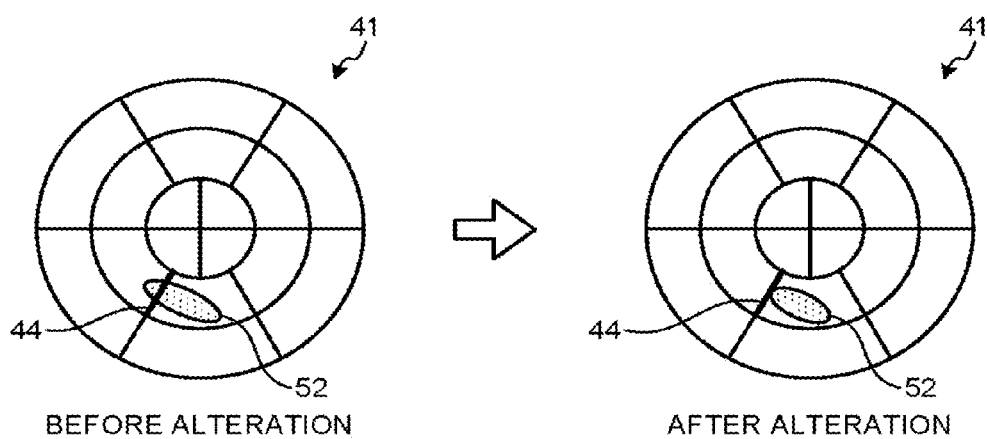
FIG. 11 is a diagram for explaining effects of the first embodiment.

FIG. 11 is a diagram for explaining effects of the first embodiment. On the left in FIG. 11, one example of a polar map 41 before alteration of a boundary is illustrated, and on the right in FIG. 11, one example of the polar map 41 after alteration of the boundary according to the ultrasonic diagnostic apparatus 1 in the first embodiment is illustrated. As illustrated in FIG. 11, the ultrasonic diagnostic apparatus 1 in the first embodiment alters mapping of information on a wall motion index without altering the position of the boundary line 44 in the polar map 41 even when the position of the boundary line 44 is altered on an SR image. In this case, the position of the boundary line 44 on the polar map 41 is not altered, but information 52 on a wall motion index mapped around the boundary line is altered. Consequently, the ultrasonic diagnostic apparatus 1 can define the position of a segment boundary in an object of graph output (region of interest) without giving an unnatural discontinuity as the boundary display on a polar map while maintaining the relative positional relation of the mapping within the segment. In the left ventricle in particular, it is enabled to fine-tune segment boundaries while applying segment boundaries to individual cases, without producing on a polar map the segmentation of a method resulting in different dividing positions from the standard ones.

The polar map display is a map representation of a topological coordinate system that, disregarding retention of information about positions concerning distances and about accurate shapes as in a three-dimensional display and an MPR display, information on relative positional relations and connections is retained. As long as the positional relations of the respective segments are maintained, even when the boundary position (or an input position on a map) of a segment in a coordinate system based on accurate distances is altered, the polar map display itself functions without any difficulty with the application of the display alteration function of a wall motion index in the first embodiment.

Furthermore, a polar map is generally known as a map in the case of a left ventricle, for example. In the case of each of the other cardiac chambers, however, a standard polar map is not yet established. Consequently, it is preferable to apply, to the left atrium and the right atrium, a display format in which, while the area of a cardiac valve (a mitral valve in the left heart system or a tricuspid valve in the right heart system) is disposed in a peripheral portion, an apex opposite thereto is disposed in the central portion as a pole. In the right ventricle, although the disposition of the region of the valve that is a periphery area of a map becomes complicated because the pulmonary valve (outflow path) is present separately from the inflow path, the ventricular apex can be disposed in the central portion as a pole.

First Modification of First Embodiment

In the above-described processing of the display controller 175, a situation has been explained in which the tracking points 51 are relocated in an equiangular manner (at equal intervals) when the density of the tracking points 51 included in the segment of the polar map is altered. The embodiment, however, is not limited to this. For example, the tracking points may be relocated while being weighted depending on distances from the altered boundary position. For example, when the boundary line 44 in an SR image is altered, the display controller 175 may move by a greater distance the tracking point 51 that is closer to the boundary line 44 and move by a smaller distance the tracking point 51 that is farther from the boundary line 44. Thus, by employing the relocation that is not at equal intervals, more natural mapping is expected.

In the example in FIG. 8B, in the segment on the right side of the boundary line 44, while scarcely altering the positions of the tracking points 51 that are at positions far from the boundary line 44, the display controller 175 narrows the disposition intervals of the tracking points 51 that are at positions close to the boundary line 44 and makes the density of these tracking points high. In contrast, in the segment on the left side of the boundary line 44, while hardly altering the positions of the tracking points 51 that are at positions far from the boundary line 44, the display controller 175 widens the disposition intervals of the tracking points 51 that are at positions close to the boundary line 44 and makes the density of these tracking points low. Specifically, it is preferable that the display controller 175 linearly alter the intervals depending on the relative distance from the boundary line 44. For example, in the segment on the right side of the boundary line 44, the display controller 175 alters the intervals by −1.5 degrees/point for each tracking point 51 from the left-hand edge, as 9.0 degrees, 10.5 degrees, 12.0 degrees, 13.5 degrees, and 15.0 degrees. In the segment on the left side of the boundary line 44, the display controller 175 alters the intervals by +5 degrees/point for each tracking point 51 from the left-hand edge, as 15 degrees, 20 degrees, and 25 degrees, for example.

Second Modification of First Embodiment

In the foregoing embodiment, the position of a boundary line is altered. However, the position of a vertex may be altered. In alteration of the position of a boundary line, the effect of the alteration extends to two segments that are adjacent to the boundary line. In contrast, in the alteration of a vertex, the effect extends to two to four segments that surround the vertex. However, as discussed in the foregoing, the density of the tracking points 51 included in each segment is altered when the position of a boundary or a vertex is altered. Consequently, the first embodiment is applicable to the case of altering the position of a boundary, to the case of altering the position of a vertex, and even to the case of combining the foregoing alteration.

Other Embodiments

Implementation in various different forms other than the foregoing embodiment is possible.

Boundary Position Alteration on MPR Image

The above-described processing of altering a boundary position by the alteration unit 174 is not limited to the foregoing examples, for example. The alteration of a boundary position may be performed on an MPR image, for example.

Figure 12:
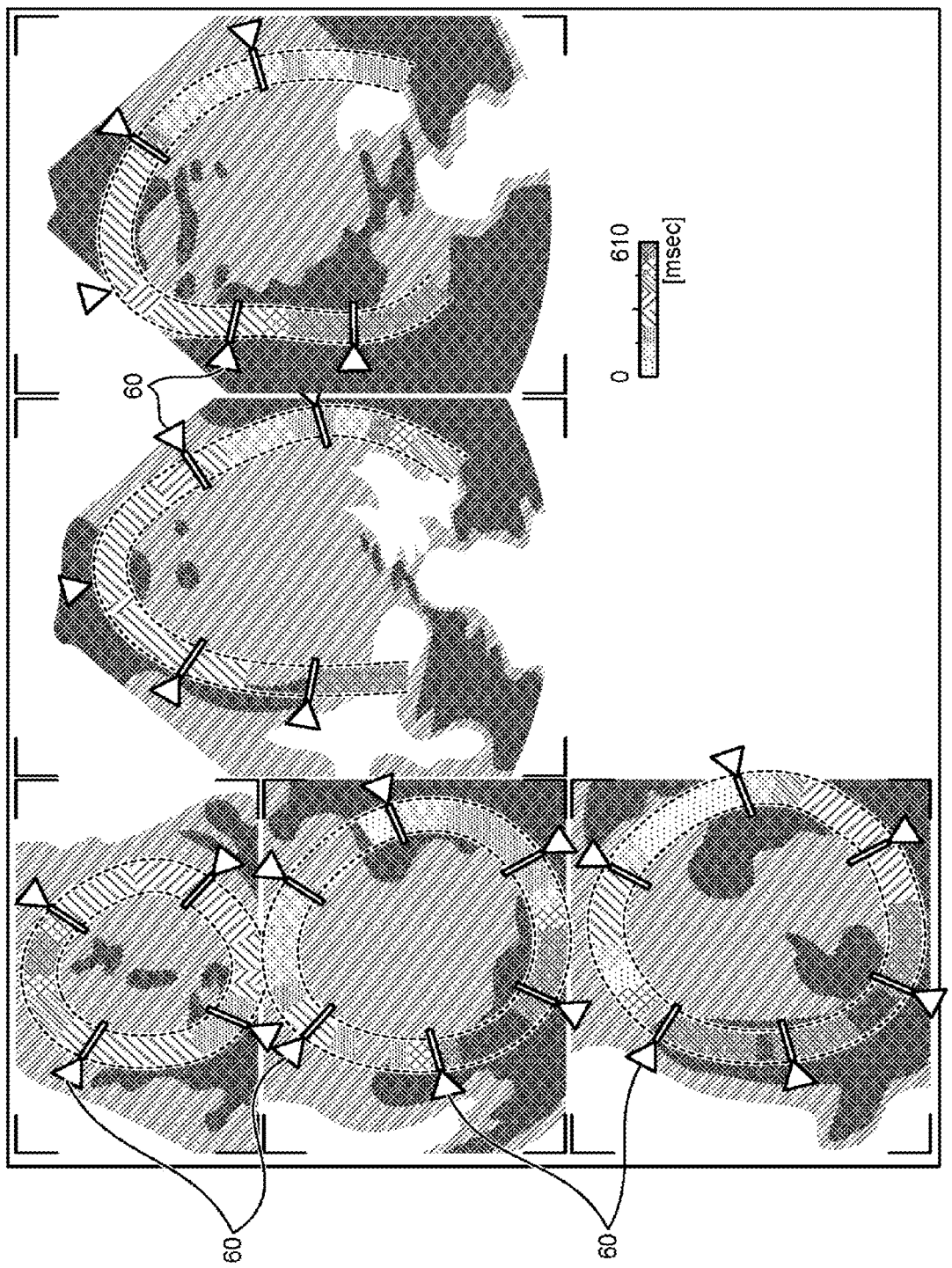
FIG. 12 is a diagram for explaining the alteration of a boundary position according to other embodiments.

FIG. 12 is a diagram for explaining the alteration of a boundary position according to another embodiment. FIG. 12 illustrates MPR images of volume data at a plurality of positions. The boundary positions of a region of interest defined in the volume data are indicated by arrow positions 60. The operator specifies a boundary position to be an object of alteration by specifying the arrow position 60 with a mouse cursor. The operator then specifies a boundary position after alteration by moving the specified arrow position 60 by drag-and-drop. Consequently, the alteration unit 174 receives the object of alteration, the direction of move, and the amount of move from the operator, and can alter the boundary position in accordance with the instruction.

Areas other than Heart

The above-described embodiment is applicable to other areas (internal organs) such as a brain and a liver when an image based on a certain projection method such as a polar map is displayed together with a rendering image of the region, for example. In this case, a medical diagnostic imaging apparatus alters the mapping of index values without altering the positions of the boundary lines on the displayed image based on the certain projection method even when the positions of the boundary lines are altered on the rendering image.

Application to Image Processing Apparatus

The functions described in the first embodiment are not limited to being applied to a medical diagnostic imaging apparatus, and are also applicable to an image processing apparatus, for example.

Figure 13:
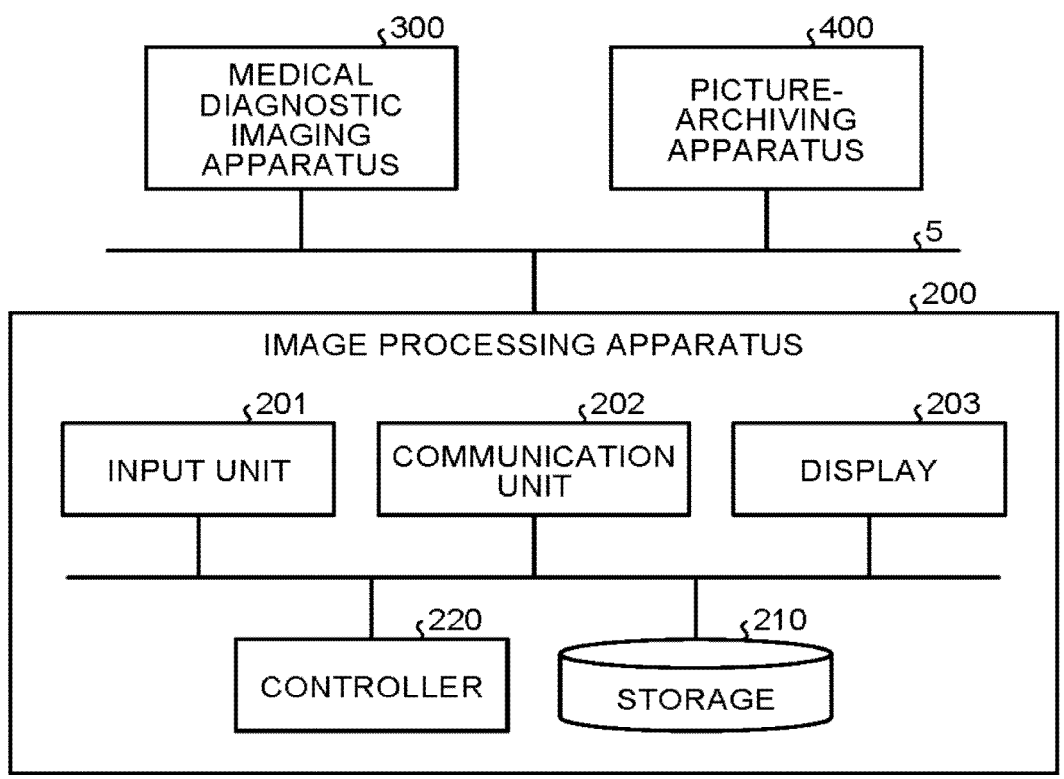
FIG. 13 is a block diagram illustrating an example of the configuration of an image processing system in the other embodiments.

FIG. 13 is a block diagram illustrating an example of the configuration of an image processing system according to other embodiments. As illustrated in FIG. 13, the image processing system in the other embodiments includes an image processing apparatus 200, a medical diagnostic imaging apparatus 300, and a picture-archiving apparatus 400. The respective apparatuses illustrated in FIG. 13 have been enabled to perform communication with one another directly or indirectly via, for example, an in-hospital local area network (LAN) 5 installed within a hospital. For example, when the image processing system is implemented with a picture archiving and communication system (PACS), the respective apparatuses transmit and receive medical image data and the like to and from one another in accordance with digital imaging and communications in medicine (DICOM) standard.

In FIG. 13, the medical diagnostic imaging apparatus 300 photographs three-dimensional medical image data, and stores the photographed three-dimensional medical image data into the picture-archiving apparatus 400, for example. The medical diagnostic imaging apparatus 300 corresponds to an ultrasonic diagnostic apparatus, an X-ray diagnostic apparatus, an X-ray computed tomography (CT) apparatus, a magnetic resonance imaging (MRI) apparatus, a single photon emission computed tomography (SPECT) apparatus, a positron emission tomography (PET) apparatus, a SPECT-CT apparatus in which a SPECT apparatus and an X-ray CT apparatus are integrally combined, a PET-CT apparatus in which a PET apparatus and an X-ray CT apparatus are integrally combined, a PET-MRI apparatus in which a PET apparatus and an MRI apparatus are integrally combined, or a group of apparatuses that includes two or more of the foregoing apparatuses, for example.

The picture-archiving apparatus 400 is a database that archives medical image data. Specifically, the picture-archiving apparatus 400 stores three-dimensional medical image data generated by the various medical diagnostic imaging apparatuses 300 into a storage unit of the picture-archiving apparatus 400 and keeps the data. The three-dimensional medical image data archived in the picture-archiving apparatus 400 is kept in association with supplementary information such as patient IDs, test IDs, device IDs, and series IDs.

The image processing apparatus 200 is a workstation, a personal computer (PC), or the like that a doctor or a laboratory technician who works in the hospital uses to view medical images, for example. The operator of the image processing apparatus 200 performs search using a patient ID, a test ID, a device ID, a series ID, and other information, and obtains necessary three-dimensional medical image data from the picture-archiving apparatus 400. Alternatively, the image processing apparatus 200 may receive three-dimensional medical image data directly from the medical diagnostic imaging apparatus 300.

The image processing apparatus 200 includes an input unit 201, a communication unit 202, a display 203, storage 210, and a controller 220. The input unit 201, the communication unit 202, the display 203, the storage 210, and the controller 220 are connected to one another.

The input unit 201 is a keyboard, a trackball, a pointing device such as a mouse or a pen tablet, or another device, and receives the input of various operations for the image processing apparatus 200 from the operator. When a mouse is used, the input with a mouse wheel can be performed. When a pen tablet is used, the input by flick operation and swipe operation can be performed. The communication unit 202 is a network interface card (NIC) or the like, and performs communication with other devices. The display 203 is a monitor, a liquid crystal panel, or the like, and displays a variety of information.

The storage 210 is a hard disk and a semiconductor memory device, for example, and stores therein a variety of information. The storage 210 stores therein a plurality of processing that the controller 220 performs, for example.

The controller 220 is an electronic circuit such as a central processing unit (CPU) or a micro processing unit (MPU), or an integrated circuit such as an application specific integrated circuit (ASIC) or a field programmable gate array (FPGA), for example, and performs the control of the image processing apparatus 200 as a whole.

The controller 220 includes the same processing modules as the obtaining unit 171, the calculating unit 172, the generator 173, and the display controller 175. That is, in the controller 220, the same processing module as the obtaining unit 171 obtains a group of three-dimensional medical image data in which an object of data collection including at least one chamber region out of the left ventricle, the left atrium, the right ventricle, and the right atrium of the heart is collected for at least one cardiac cycle. The same processing module as the calculating unit 172 calculates a wall motion index on the chamber region from the group of three-dimensional medical image data. The same processing module as the generator 173 generates, based on a certain projection method concerning the chamber region, a map in which respective pieces of the information on the wall motion index of a plurality of regions into which the chamber region has been divided are disposed on a plurality of sections corresponding to the regions, and outputs the map to a display unit. The same processing module as the display controller 175, when the boundary line of a region corresponding to at least one section of a plurality of sections is altered by an instruction received from the operator, changes the display of the wall motion indices with the layout positions of the sections in the map being maintained. Consequently, the image processing apparatus 200 can display an image in which the referentiality regarding the regional motion within a region of interest is maintained, even when a boundary fractionating the region of interest is altered.

In the above-described embodiments, for example, the respective constituent elements of the devices and apparatuses illustrated are functionally conceptual, and do not necessarily need to be configured physically as illustrated. That is, the specific forms of distribution or integration of the devices and apparatuses are not limited to those illustrated, and the whole or a part thereof can be configured by being functionally or physically distributed or integrated in any form of units, depending on various types of loads, usage conditions, and the like. Furthermore, the whole of or a part of the various processing functions performed in the respective devices and apparatuses can be implemented by a CPU, and a program executed by the CPU, or implemented as hardware by wired logic.

An area to which the above-described image processing method is applied is not limited to the heart, and may be the lungs and liver.

In the above-described embodiments, the situations in which the embodiments are applied to the WMT have been explained. However, the embodiments are not limited to this. That is, the embodiments are widely applicable to situations of altering the boundary of a region of interest defined on the surface of an area of a photographic subject included in volume data. The surface of the area of the subject may be the surface (contours) of an internal organ of the subject and the surface of a tumor within an internal organ, or may be the body surface. In this case, the surface of the subject may be detected by any desired conventional technology.

The image processing method described in the foregoing embodiments and modification can be implemented by executing a previously prepared image processing program on a computer such as a personal computer and a workstation. This image processing program can be distributed via a network such as the Internet. The image processing program can also be recorded on a computer-readable recording medium such as a hard disk, a flexible disk (FD), a compact disc read only memory (CD-ROM), a magnetic optical disc (MO), or a digital versatile disc (DVD), and executed by being read out from the recording medium by the computer.

As in the foregoing, according to at least one of the described embodiments, the boundary of a region of interest in a three-dimensional image can be adjusted easily.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A medical diagnostic imaging apparatus comprising:
storage circuitry configured to store therein volume data concerning a three-dimensional region inside an object; and
processing circuitry configured to calculate an index value concerning the volume data and generate a polar map image and a medical image based on the index value, the medical image being different from the polar map image, wherein
respective positions in the polar map image and the medical image are associated with each other by a certain coordinate conversion,
the volume data is divided into a plurality of first regions by a first boundary position, the polar map image is divided into a plurality of second regions by a second boundary position, and the processing circuitry receives an instruction that alters the first boundary position and alters mapping of the index value in the polar map image without altering the second boundary position in response to the instruction.

2. The apparatus according to claim 1, wherein
the three-dimensional region includes at least one chamber region out of the left ventricle, the left atrium, the right ventricle, and the right atrium of the heart of the object, and the second region is a section in the polar map image.

3. The apparatus according to claim 1, wherein the index value is calculated based on a position of each composition point that determines the volume data.

4. The apparatus according to claim 1, wherein the volume data is a group of data in time series collected over time concerning the three-dimensional region.

5. The apparatus according to claim 1, wherein
the processing circuitry causes a display to display the polar map image, and the polar map image is an image in which at least one of hue, saturation, and lightness determined based on the index value in each of the first regions is assigned to each of the second regions.

6. The apparatus according to claim 1, wherein
the processing circuitry causes a display to display the medical image, and the medical image is an image in which at least one of hue, saturation, and lightness determined based on the index value in each of the first regions is assigned to each of the first regions.

7. The apparatus according to claim 5, wherein the at least one of hue, saturation, and lightness assigned to each of the second regions is determined based on a statistical value by using the index values in each of the first regions.

8. The apparatus according to claim 1, wherein the processing circuitry receives an instruction from an operator and alters the first boundary position, causes a display to display a superimposed image in which information on the index value and boundary positions of the first regions are superimposed on an image generated from the volume data by three-dimensional rendering processing or cross-section reconstruction processing, and alters a boundary line of or a vertex of a boundary of a region corresponding to the instruction received from the operator who has referred to the superimposed image.

9. The apparatus according to claim 1, wherein the processing circuitry determines a first pixel value disposed in a section near the altered first boundary position by interpolation processing using pixel values based on index values disposed around the first pixel value.

10. The apparatus according to claim 1, wherein the processing circuitry calculates the index value by processing including pattern matching between pieces of three-dimensional medical image data included in obtained volume data for at least one cardiac cycle.

11. The apparatus according to claim 1, wherein the volume data is a group of ultrasonic image data including a plurality of pieces of three-dimensional ultrasonic image data generated by transmission and reception of ultrasonic waves.

12. An image processing apparatus comprising:
storage circuitry configured to store therein volume data concerning a three-dimensional region inside an object; and processing circuitry configured to calculate an index value concerning the volume data and generate a polar map image and a medical image based on the index value, the medical image being differ from the polar map image, wherein respective positions in the polar map image and the medical image are associated with each other by a certain coordinate conversion, the volume data is divided into a plurality of first regions by a first boundary position, the polar map image is divided into a plurality of second regions by a second boundary position, and the processing circuitry receives an instruction that alters the first boundary position and alters mapping of the index value in the polar map image without altering the second boundary position in response to the instruction.

13. An image generating method comprising:
calculating an index value concerning volume data concerning a three-dimensional region inside an object; and generating a polar map image and a medical image based on the index value, the medical image being differ from the polar map image, wherein respective positions in the polar map image and the medical image are associated with each other by a certain coordinate conversion, the volume data is divided into a plurality of first regions by a first boundary position, the polar map image is divided into a plurality of second regions by a second boundary position that is not altered in accordance with alteration of the first boundary position, and the image generating method further comprising:
receiving an instruction that alters the first boundary position; and altering mapping of the index value in the polar map image without altering the second boundary position in response to the instruction.

* * * * *